United States Patent
Shibata et al.

(10) Patent No.: US 9,382,830 B2
(45) Date of Patent: Jul. 5, 2016

(54) EXHAUST GAS PURIFICATION APPARATUS FOR AN INTERNAL COMBUSTION ENGINE

(75) Inventors: Daisuke Shibata, Numazu (JP); Toru Kidokoro, Hadano (JP); Kazuya Takaoka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/634,155

(22) PCT Filed: Sep. 20, 2011

(86) PCT No.: PCT/JP2011/071345
§ 371 (c)(1),
(2), (4) Date: Sep. 11, 2012

(87) PCT Pub. No.: WO2013/042188
PCT Pub. Date: Mar. 28, 2013

(65) Prior Publication Data
US 2014/0199210 A1   Jul. 17, 2014

(51) Int. Cl.
*F01N 3/20* (2006.01)
*F01N 3/10* (2006.01)
*F01N 3/035* (2006.01)
*F01N 13/00* (2010.01)
*B01D 53/94* (2006.01)

(52) U.S. Cl.
CPC ............ *F01N 3/206* (2013.01); *B01D 53/9477* (2013.01); *F01N 3/035* (2013.01); *F01N 3/106* (2013.01); *F01N 3/208* (2013.01); *F01N 13/009* (2014.06); *B01D 53/9418* (2013.01); *B01D 53/9495* (2013.01); *F01N 2900/0418* (2013.01); *F01N 2900/0601* (2013.01); *F01N 2900/1404* (2013.01); *F01N 2900/1411* (2013.01); *F01N 2900/1622* (2013.01); *Y02T 10/24* (2013.01)

(58) Field of Classification Search
None
See application file for complete search history.

(56) References Cited

U.S. PATENT DOCUMENTS

2010/0111774 A1* 5/2010 Toshioka et al. .............. 422/105
2010/0242438 A1* 9/2010 Mital .............................. 60/274

FOREIGN PATENT DOCUMENTS

| EP | 2754867 A1 | 7/2014 |
|---|---|---|
| JP | 2008-255905 A | 10/2008 |
| JP | 2009-85172 A | 4/2009 |
| JP | 2010-229957 A | 10/2010 |
| JP | 2011-80439 A | 4/2011 |

OTHER PUBLICATIONS

International Search Report for PCT/JP2011/071345 dated Dec. 20, 2011.

* cited by examiner

*Primary Examiner* — Walter D Griffin
*Assistant Examiner* — Jelitza Perez
(74) *Attorney, Agent, or Firm* — Sughrue Mion, PLLC

(57) ABSTRACT

An exhaust gas purification apparatus including a filter, an NOx selective reduction catalyst at the downstream side of the filter, a supply device for supplying a reducing agent to the NOx selective reduction catalyst, and a PM sensor for detecting an amount of particulate matter in an exhaust gas at the downstream side of the NOx selective reduction catalyst. A supply decrease part makes an amount of supply of the reducing agent smaller in cases where at least one of several conditions is satisfied.

6 Claims, 13 Drawing Sheets

EXHAUST GAS PURIFICATION APPARATUS FOR AN INTERNAL COMBUSTION ENGINE

CROSS REFERENCE TO RELATED APPLICATIONS

This application is a National Stage of International Application No. PCT/JP2011/071345 filed Sep. 20, 2011, the contents of which are incorporated herein by reference in their entirety.

TECHNICAL FIELD

The present invention relates to an exhaust gas purification apparatus for an internal combustion engine.

BACKGROUND ART

In an exhaust gas purification apparatus in which urea is supplied to an NOx selective reduction catalyst (hereinafter also referred to simply as an "NOx catalyst"), there has been known a technique in which when an amount of intermediate products, which have been generated in the course of the reaction from urea to ammonia and which have been accumulated in an exhaust passage, reaches an upper limit amount, the supply of urea water is prohibited (see, for example, a first patent document). According to this technique, a reducing agent can be supplied to the NOx catalyst until the amount of the intermediate products accumulated in the exhaust passage reaches the upper limit amount.

However, a filter for trapping particulate matter (hereinafter also referred to as "PM") may be arranged in the exhaust passage. Further, in order to determine a failure of this filter, there may be provided with a PM sensor which detects an amount of particulate matter in an exhaust gas. When the above-mentioned intermediate products adhere to electrodes or a cover of this PM sensor, there will be a fear that it may become difficult to accurately detect the amount of particulate matter. In that case, there will also be a fear that the accuracy in failure determination of the filter may become low.

PRIOR ART REFERENCES

Patent Documents

[First Patent Document] Japanese patent application laid-open No. 2009-085172

SUMMARY OF THE INVENTION

Problems to be Solved by the Invention

The present invention has been made in view of the problems as referred to above, and the object of the present invention is to suppress a reduction in the accuracy in the failure determination of a filter due to a reduction in the detection accuracy of a PM sensor.

Means for Solving the Problems

In order to attain the above-mentioned object, an exhaust gas purification apparatus for an internal combustion engine according to the present invention is provided with:

a filter that is arranged in an exhaust passage of the internal combustion engine for trapping particulate matter contained in an exhaust gas;

an NOx selective reduction catalyst that is arranged at the downstream side of said filter and reduces NOx by means of a reducing agent which is supplied thereto;

a supply device that supplies the reducing agent to said NOx selective reduction catalyst from the upstream side of said NOx selective reduction catalyst;

a PM sensor that detects an amount of the particulate matter in the exhaust gas at the downstream side of said NOx selective reduction catalyst; and a controller having control logic which, makes an amount of supply of the reducing agent smaller in cases where at least one of the following conditions is satisfied than in cases where any of the conditions is not satisfied, wherein the conditions include: a condition in which the temperature of said NOx selective reduction catalyst is equal to or less than a threshold value; a condition in which the temperature of the exhaust gas is equal to or less than a threshold value; a condition in which the flow rate of the exhaust gas is equal to or larger than a threshold value; and a condition in which the amount of adsorption of the reducing agent in said NOx selective reduction catalyst is equal to or larger than a threshold value.

Here, when the reducing agent is supplied from the supply device, a part of the reducing agent may pass through the NOx selective reduction catalyst, and adhere to the PM sensor, depending on the state of the exhaust gas or the NOx selective reduction catalyst. When the reducing agent adheres to the PM sensor, an output value of the PM sensor will be changed, thus making it difficult to detect the particulate matter in an accurate manner. On the other hand, the controller makes the amount of the supply of the reducing agent smaller in the case of a state where the reducing agent passes through the NOx selective reduction catalyst than in the case of a state where the reducing agent does not pass through the NOx selective reduction catalyst. As a result of this, it is possible to suppress the reducing agent from passing through the NOx selective reduction catalyst, and hence, it is possible to suppress the reducing agent from adhering to the PM sensor. Accordingly, it is possible to suppress a reduction in the accuracy of the failure determination of the filter.

Then, for example, in cases where the temperature of the NOx selective reduction catalyst is low, or in cases where the temperature of the exhaust gas is low, or in cases where the flow rate of the exhaust gas is large, or in cases where the amount of reducing agent having adsorbed to the NOx selective reduction catalyst is large, it can be in a state where the reducing agent passes through the NOx selective reduction catalyst.

When the temperature of the NOx selective reduction catalyst becomes low, it becomes difficult for the reducing agent to carry out reactions in the NOx selective reduction catalyst, and hence, it becomes easy for the reducing agent to pass through the NOx selective reduction catalyst. That is, there is a correlation between the temperature of the NOx selective reduction catalyst and the amount of the reducing agent passing through the NOx selective reduction catalyst. In addition, when the temperature of the exhaust gas at the upstream side of the NOx selective reduction catalyst becomes low, it becomes difficult for the reducing agent to carry out reactions in the NOx selective reduction catalyst, and hence, it becomes easy for the reducing agent to pass through the NOx selective reduction catalyst. That is, there is a correlation between the temperature of the exhaust gas and the amount of the reducing agent passing through the NOx selective reduction catalyst. Moreover, when the flow rate of the exhaust gas passing through the NOx selective reduction catalyst becomes large, it becomes easy for the reducing agent to pass through the NOx selective reduction catalyst before the reaction of the reducing agent in the NOx selective reduction catalyst ends. That is, there is a correlation between the flow rate of the exhaust gas and the amount of the reducing agent passing through the NOx selective reduction catalyst. Further, when the amount of reducing agent having adsorbed to the NOx selective reduction catalyst becomes large, it becomes difficult for a reducing agent to adsorb to the NOx selective reduction catalyst, and hence it becomes easy for the reducing agent to pass through the NOx selective reduction catalyst. That is, there is a correlation between the amount of adsorption of the reducing agent and the amount of the reducing agent passing through the NOx selective reduction catalyst.

For this reason, the amount of the supply of the reducing agent is made small in cases where there is satisfied at least one of the following conditions which include: a condition in which the temperature of the NOx selective reduction catalyst is equal to or less than a threshold value; a condition in which the temperature of the exhaust gas is equal to or less than a threshold value; a condition in which the flow rate of the exhaust gas is equal to or larger than a threshold value; and a condition in which the amount of adsorption of the reducing agent in the NOx selective reduction catalyst is equal to or larger than a threshold value. By doing so, it is possible to suppress the reducing agent from adhering to the PM sensor, thus making it possible to suppress a reduction in the accuracy of the failure determination of the filter.

Here, note that the threshold value in the temperature of the NOx selective reduction catalyst referred to herein can be set to an upper limit value of the temperature at which the reducing agent passes through the NOx selective reduction catalyst, or an upper limit value of the temperature at which the reducing agent adheres to the PM sensor. In addition, such a threshold value may also be set to a temperature of the NOx selective reduction catalyst at which the amount of reducing agent adhering to the PM sensor falls within an allowable range.

In addition, the threshold value in the temperature of the exhaust gas can be set to an upper limit value of the temperature at which the reducing agent passes through the NOx selective reduction catalyst, or an upper limit value of the temperature at which the reducing agent adheres to the PM sensor. Moreover, such a threshold value may also be set to a temperature of the exhaust gas at which the amount of reducing agent adhering to the PM sensor falls within an allowable range.

Also, the threshold value in the flow rate of the exhaust gas can be set to a lower limit value of the flow rate at which the reducing agent passes through the NOx selective reduction catalyst, or a lower limit value of the flow rate at which the reducing agent adheres to the PM sensor. Moreover, such a threshold value may also be set to a flow rate of the exhaust gas at which the amount of reducing agent adhering to the PM sensor falls within an allowable range. Here, note that the flow rate of the exhaust gas may be replaced with the flow speed of the exhaust gas.

Further, the threshold value in the amount of adsorption of the reducing agent can be set to a lower limit value of the amount of adsorption at which the reducing agent passes through the NOx selective reduction catalyst, or a lower limit value of the amount of adsorption at which the reducing agent adheres to the PM sensor. In addition, such a threshold value may also be set to an amount of adsorption of the reducing agent at which the amount of reducing agent adhering to the PM sensor falls within an allowable range. Here, note that the amount of adsorption of the reducing agent in the NOx selective reduction catalyst may also be replaced with the rate of adsorption of the reducing agent in the NOx selective reduction catalyst. This adsorption rate is a value which is obtained by dividing the amount of reducing agent which has been adsorbed by a maximum amount of reducing agent which can be adsorbed.

Here, note that the reducing agent includes a substance supplied from the supply device, substances finally produced from the substance supplied from the supply device, and intermediate products which ranges from the substance supplied from the supply device to the substances finally produced. Any of these substances reacts with NOx in the NOx selective reduction catalyst, so that the NOx is reduced.

In addition, to make the amount of the supply of the reducing agent small can also include not carrying out the supply of the reducing agent. This may also be to prohibit the supply of the reducing agent. Due to not carrying out the supply of the reducing agent, it is possible to suppress the reducing agent from adhering to the sensor 6 in a more effective manner.

Moreover, in the present invention, said controller can calculate the amount of the reducing agent passing through said NOx selective reduction catalyst based on at least one of the temperature of said NOx selective reduction catalyst or the temperature of the exhaust gas, the flow rate of said exhaust gas, and the amount of adsorption of the reducing agent in said NOx selective reduction catalyst, in such a manner that the amount of the reducing agent passing through said NOx selective reduction catalyst becomes larger in accordance with the decreasing temperature of said NOx selective reduction catalyst or the decreasing temperature of the exhaust gas, or the increasing flow rate of the exhaust gas, or the increasing amount of adsorption of the reducing agent in said NOx selective reduction catalyst. Then, said controller can decide the amount of the supply of the reducing agent in such a manner that the amount of the reducing agent passing through the NOx selective reduction catalyst becomes less than a threshold value.

Here, there is a correlation between the temperature of the NOx selective reduction catalyst and the amount of the reducing agent passing through the NOx selective reduction catalyst, so that the lower the temperature of the NOx selective reduction catalyst, the larger becomes the amount of the reducing agent passing through the NOx selective reduction catalyst. In addition, there is a correlation between the temperature of the exhaust gas and the amount of the reducing agent passing through the NOx selective reduction catalyst, so that the lower the temperature of the exhaust gas, the larger becomes the amount of the reducing agent passing through the NOx selective reduction catalyst. Moreover, there is a correlation between the flow rate of the exhaust gas and the amount of the reducing agent passing through the NOx selective reduction catalyst, so that the larger the flow rate of the exhaust gas, the larger becomes the amount of the reducing agent passing through the NOx selective reduction catalyst. Further, there is a correlation between the amount of adsorption of the reducing agent in the NOx selective reduction catalyst and the amount of the reducing agent passing through the NOx selective reduction catalyst, so that the larger the amount of adsorption, the larger becomes the amount of the reducing agent passing through the NOx selective reduction catalyst. Based on these relations, it is possible to obtain the amount of the reducing agent passing through the NOx selective reduction catalyst.

The threshold value of the amount of the reducing agent passing through the NOx selective reduction catalyst can be set such that it is an amount of the reducing agent which passes through the NOx selective reduction catalyst, and that it is an amount of the reducing agent at the time when an influence of the reducing agent exerted on the detected value of the PM sensor exceeds an allowable range. In addition, the threshold value may also be set such that it is an amount of reducing agent passing through the NOx selective reduction catalyst, and that it is a lower limit value of the amount of reducing agent at which the detected value of the PM sensor changes. That is, when the amount of reducing agent passing through the NOx selective reduction catalyst becomes equal to or larger than the threshold value, the accuracy of the failure determination of the filter becomes low due to the influence of the reducing agent adhering to the PM sensor. On the other hand, if the reducing agent is supplied in such a manner that the amount of the reducing agent passing through the NOx selective reduction catalyst becomes less than the threshold value thereof, the reducing agent has almost no influence on the detected value of the PM sensor, thus making it possible to suppress a reduction in the accuracy of the failure determination of the filter.

Further, in the present invention, said controller calculates the amount of the reducing agent passing through said NOx selective reduction catalyst based on at least one of the temperature of said NOx selective reduction catalyst or the temperature of the exhaust gas, the flow rate of said exhaust gas, and the amount of adsorption of the reducing agent in said NOx selective reduction catalyst, in such a manner that the amount of the reducing agent passing through said NOx selective reduction catalyst becomes larger in accordance with the decreasing temperature of said NOx selective reduction catalyst or the decreasing temperature of the exhaust gas, or the increasing flow rate of the exhaust gas, or the increasing amount of adsorption of the reducing agent in said NOx selective reduction catalyst. Then, said controller can prohibit the supply of the reducing agent in cases where the amount of the reducing agent passing through the NOx selective reduction catalyst is equal to or larger than a threshold value.

As described above, there is a correlation between the temperature of the NOx selective reduction catalyst and the amount of the reducing agent passing through the NOx selective reduction catalyst, so that the lower the temperature of the NOx selective reduction catalyst, the larger becomes the amount of the reducing agent passing through the NOx selective reduction catalyst. In addition, there is a correlation between the temperature of the exhaust gas and the amount of the reducing agent passing through the NOx selective reduction catalyst, so that the lower the temperature of the exhaust gas, the larger becomes the amount of the reducing agent passing through the NOx selective reduction catalyst. Moreover, there is a correlation between the flow rate of the exhaust gas and the amount of the reducing agent passing through the NOx selective reduction catalyst, so that the larger the flow rate of the exhaust gas, the larger becomes the amount of the reducing agent passing through the NOx selective reduction catalyst. Further, there is a correlation between the amount of adsorption of the reducing agent in the NOx selective reduction catalyst and the amount of the reducing agent passing through the NOx selective reduction catalyst, so that the larger the amount of adsorption, the larger becomes the amount of the reducing agent passing through the NOx selective reduction catalyst. Based on these relations, it is possible to obtain the amount of the reducing agent passing through the NOx selective reduction catalyst.

The threshold value of the amount of the reducing agent passing through the NOx selective reduction catalyst can be set such that it is an amount of the reducing agent which passes through the NOx selective reduction catalyst, and that it is an amount of the reducing agent at the time when an influence of the reducing agent exerted on the detected value of the PM sensor exceeds an allowable range. In addition, the threshold value may also be set such that it is an amount of reducing agent passing through the NOx selective reduction catalyst, and that it is a lower limit value of the amount of reducing agent at which the detected value of the PM sensor changes. That is, when the amount of reducing agent passing through the NOx selective reduction catalyst becomes equal to or larger than the threshold value, the accuracy of the failure determination of the filter becomes low due to the influence of the reducing agent adhering to the PM sensor. On the other hand, if the supply of the reducing agent is prohibited in a case where the amount of the reducing agent passing through the NOx selective reduction catalyst is equal to or larger than the threshold value, it is possible to suppress the accuracy of the failure determination of the filter from being reduced.

In addition, in the present invention, provision can be made for a supply increase part that supplies an amount of reducing agent in advance when it is in a state where the reducing agent does not pass through said NOx selective reduction catalyst, said amount of reducing agent thus supplied serving to reduce NOx when it becomes a state where the reducing agent passes through said NOx selective reduction catalyst so that the amount of the supply of the reducing agent is made small by said controller.

Here, during a period of time in which the amount of the supply of the reducing agent is made small by the controller, the amount of NOx having adsorbed to the NOx selective reduction catalyst decreases due to NOx which flows into the NOx selective reduction catalyst. When this state continues so long that all the reducing agent having adsorbed to the NOx selective reduction catalyst is consumed, there will be a fear that removal of NOx may become impossible. On the other hand, before the amount of the supply of the reducing agent is made small by the controller, the supply increase part serves to cause a larger amount of reducing agent than an ordinary amount to be adsorbed to the NOx selective reduction catalyst in advance. The ordinary amount referred to herein is a case where an amount of reducing agent corresponding to an amount of NOx in the exhaust gas is supplied. Ordinarily, for example, the amount of the supply of the reducing agent is decided so as to compensate for the reducing agent which has been consumed in the NOx selective reduction catalyst.

On the other hand, the supply increase part supplies the reducing agent in an amount larger than the amount of the reducing agent consumed in the NOx selective reduction catalyst. At this time, the amount of the reducing agent to be supplied is made not to exceed a maximum amount of the reducing agent which can be adsorbed to the NOx selective reduction catalyst. In this manner, by causing a large mount of reducing agent to be adsorbed to the NOx selective reduction catalyst in advance, it is possible to suppress the reducing agent from becoming short, when the amount of the supply of the reducing agent is made small by the controller. As a result of this, it is possible to suppress a reduction in the removal rate of NOx.

Moreover, in the present invention, said supply increase part can decide the amount of the reducing agent to be supplied, based on a difference between a temperature of the NOx selective reduction catalyst at which the reducing agent does not pass through said NOx selective reduction catalyst and a temperature of said NOx selective reduction catalyst at the present point in time.

As described above, in cases where the flow rate of the exhaust gas is large, or in cases where the temperature of the NOx selective reduction catalyst is low, the reducing agent tends to pass through the NOx selective reduction catalyst.

Here, as the flow rate of the exhaust gas increases, the temperature of the exhaust gas goes up, so that the temperature of the NOx selective reduction catalyst becomes higher in a gradual manner. For this reason, even if the flow rate of the exhaust gas increases so that the reducing agent passes through the NOx selective reduction catalyst, when the temperature of the NOx selective reduction catalyst becomes high, it will be in a state where the reducing agent does not pass through the NOx selective reduction catalyst. That is, the temperature of the NOx selective reduction catalyst is low at the present point in time so that the reducing agent passes through, but when the temperature thereof goes up, the reducing agent will not pass through. Then, when it comes to the state where the reducing agent does not pass through the NOx selective reduction catalyst, it is not necessary to decrease the amount of the supply of the reducing agent. Accordingly, if the supply increase part has caused the reducing agent to be adsorbed to the NOx selective reduction catalyst in advance so as to compensate for an amount of the reducing agent which will be consumed during a period of time in which the temperature thereof rises up to a temperature at which the reducing agent does not pass through the NOx selective reduction catalyst, it will be able to suppress the removal rate of NOx from being reduced during the period of time in which the temperature rises up to a temperature at which the reducing agent does not pass through.

Further, in the present invention, provision can be made for a postponement part that postpones the supply of the reducing agent until it becomes a state where the reducing agent does not pass through said NOx selective reduction catalyst, in case when the time comes to supply the reducing agent during a period of time from a point in time at which it has become a state where the reducing agent passes through said NOx selective reduction catalyst, to a point in time at which it becomes a state where the reducing agent does not pass through said NOx selective reduction catalyst, said postponement part deciding an amount of reducing agent to be supplied after it has become a state where the reducing agent does not pass through said NOx selective reduction catalyst, based on an integrated value of an amount of NOx which has flowed into said NOx selective reduction catalyst from the last supply of the reducing agent.

For example, in cases where the supply increase part has not been able to cause the reducing agent to be adsorbed in advance, or in cases where the supply of the reducing agent is carried out at some long interval, there will be a fear that the reducing agent may become short, when the amount of the supply of the reducing agent is made small by the controller. In general, the supply of the reducing agent is carried out at the time when an integrated value of the amount of NOx flowing into the NOx selective reduction catalyst reaches a prescribed value, or it is carried out at each prescribed interval of time. In cases where the supply of the reducing agent is carried out at each prescribed interval or period of time, an amount of the reducing agent to be supplied is decided based on an integrated value of the amount of NOx which has flowed into the NOx selective reduction catalyst within a prescribed period of time. Thus, in case when the integrated value of the amount of NOx flowing into the NOx selective reduction catalyst reaches the prescribed value, or in case when the prescribed period of time has elapsed from the last supply of the reducing agent, it comes to the time to supply the reducing agent.

Then, even if it comes to the time to supply the reducing agent, during a period of time in which the amount of the supply of the reducing agent is made small by the controller, the supply of the reducing agent is not carried out at that time. Thereafter, when it comes to the state where the reducing agent does not pass through the NOx selective reduction catalyst, the reducing agent is supplied. Then, at the time of supplying the reducing agent, an amount of supply of the reducing agent is decided by using an integrated value of the amount of NOx obtained at the time when the reducing agent is actually supplied, instead of using an integrated value of the amount of NOx obtained at the time when it has come to the time to supply the reducing agent. That is, an amount of reducing agent corresponding to an amount of NOx which has flowed into the NOx selective reduction catalyst in a period of time in which the supply of the reducing agent has been postponed is additionally supplied. As a result of this, the amount of the reducing agent having adsorbed to the NOx selective reduction catalyst can be caused to increase in a quick manner, thus making it possible to suppress the removal rate of NOx from being reduced.

Effect of the Invention

According to the present invention, it is possible to suppress a reduction in the accuracy of the failure determination of a filter due to a reduction in the detection accuracy of a PM sensor.

MODES FOR CARRYING OUT THE INVENTION

Hereinafter, reference will be made to specific embodiments of an exhaust gas purification apparatus for an internal combustion engine according to the present invention based on the attached drawings.

First Embodiment

Figure 1:
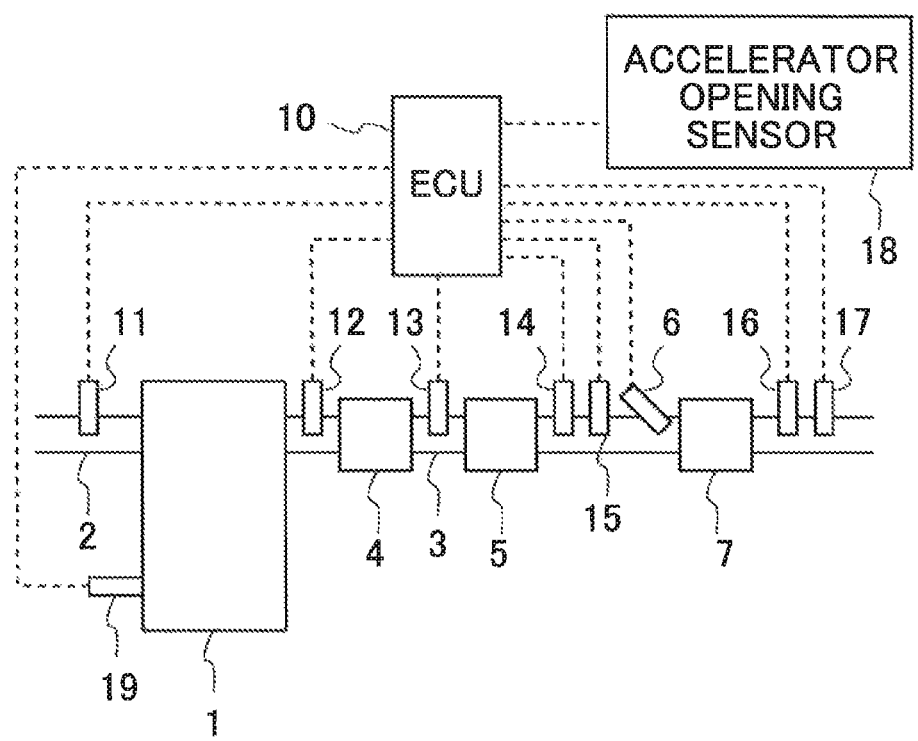
FIG. 1 is a view showing the schematic construction of an exhaust gas purification apparatus for an internal combustion engine according to embodiments of the present invention.

FIG. 1 is a view showing the schematic construction of an exhaust gas purification apparatus of an internal combustion engine according to this first embodiment of the present invention. An internal combustion engine 1 shown in FIG. 1 is a diesel engine, but it may be a gasoline engine.

An intake passage 2 and an exhaust passage 3 are connected to the internal combustion engine 1. An air flow meter 11 for detect the amount of intake air flowing through the intake passage 2 is arranged in the intake passage 2. On the other hand, an oxidation catalyst 4, a filter 5, an injection valve 6, and an NOx selective reduction catalyst 7 (hereinafter referred to as the NOx catalyst 7) are sequentially arranged in the exhaust passage 3 in this order from an upstream side in the direction of flow of an exhaust gas.

The oxidation catalyst 4 should just be a catalyst which has an oxidation ability, and may be a three-way catalyst, for example. The oxidation catalyst 4 may be supported on the filter 5.

The filter 5 traps PM (particulate matter) contained in the exhaust gas. Here, note that a catalyst may be supported on the filter 5. As the particulate matter is trapped by the filter 5, the particulate matter accumulates or deposits on the filter 5 in a gradual manner. Then, by carrying out so-called filter regeneration processing in which the temperature of the filter 5 is raised in a forced manner, the particulate matter deposited on the filter 5 can be oxidized and removed. For example, the temperature of the filter 5 can be raised by supplying HC to the oxidation catalyst 4. In addition, instead of providing with the oxidation catalyst 4, provision may also be made for other devices which serve to raise the temperature of the filter 5. Moreover, the temperature of the filter 5 may also be raised by causing hot gas to be discharged from the internal combustion engine 1.

The injection valve 6 injects a reducing agent. For the reducing agent, there can be used one derived from ammonia, such as, for example, urea water or the like. For example, the urea water injected from the injection valve 6 is hydrolyzed by the heat of the exhaust gas, as a result of which ammonia ($NH_3$) is produced, and a part or all thereof adsorbs to the NOx catalyst 7. In the following, it is assumed that urea water is injected as the reducing agent from the injection valve 6. Here, note that in this embodiment, the injection valve 6 corresponds to a supply device in the present invention.

The NOx catalyst 7 reduces the NOx in the exhaust gas in the existence of the reducing agent. For example, if ammonia ($NH_3$) is caused to be adsorbed to the NOx catalyst 7 in advance, it will be possible to reduce NOx by means of ammonia at the time when the NOx passes through the NOx catalyst 7.

A first exhaust gas temperature sensor 12 for measuring the temperature of the exhaust gas is arranged in the exhaust passage 3 at a location upstream of the oxidation catalyst 4. A second exhaust gas temperature sensor 13 for measuring the temperature of the exhaust gas is arranged in the exhaust passage 3 at a location downstream of the oxidation catalyst 4 and upstream of the filter 5. A third exhaust gas temperature sensor 14 for detecting the temperature of the exhaust gas and a first NOx sensor 15 for detecting the concentration of NOx in the exhaust gas are arranged in the exhaust passage 3 at locations downstream of the filter 5 and upstream of the injection valve 6. A second NOx sensor 16 for measuring the concentration of NOx in the exhaust gas and a PM sensor 17 for measuring the amount of particulate matter in the exhaust gas are arranged in the exhaust passage 3 at location downstream of the NOx catalyst 7. All of these sensors are not indispensable, but some of them can be provided as required.

In the internal combustion engine 1 constructed as stated above, there is arranged in combination therewith an ECU 10 which is an electronic control unit for controlling the internal combustion engine 1. This ECU 10 controls the internal combustion engine 1 in accordance with the operating conditions of the internal combustion engine 1 and/or driver's requirements.

The above-mentioned sensors, an accelerator opening sensor 18, which is able to detect an engine load by outputting an electrical signal corresponding to an amount of depression of an accelerator pedal, and a crank position sensor 19, which detects the number of revolutions per minute of the engine, are connected to the ECU 10 through electrical wiring, and the output signals of these sensors are inputted to the ECU 10. On the other hand, the injection valve 6 is connected to the ECU 10 through electrical wiring, so that the injection valve 6 is controlled by the ECU 10.

When the amount of particulate matter deposited on the filter 5 becomes equal to or more than a predetermined amount, the ECU 10 will carry out the above-mentioned filter regeneration processing. Here, note that the filter regeneration processing may be carried out at the time when the mileage or travel distance of a vehicle on which the internal combustion engine 1 is mounted becomes equal to or more than a predetermined distance. In addition, the filter regeneration processing may be carried out at each specified period of time.

In addition, the ECU 10 carries out failure determination of the filter 5 based on the amount of particulate matter detected by the PM sensor 17. Here, when a failure such as cracking of the filter 5 or the like occurs, the amount of particulate matter flowing through the filter 5 will increase. If the PM sensor 17 detects such an increase in the amount of particulate matter, the failure of the filter 5 can be determined.

For example, the failure determination of the filter 5 is carried out by making a comparison between an integrated value of the amount of particulate matter during a predetermined period of time calculated based on the detected value of the PM sensor 17, and an integrated value of the amount of particulate matter during the predetermined period of time in the case of assuming that the filter 5 is in a predetermined state.

Figure 2:
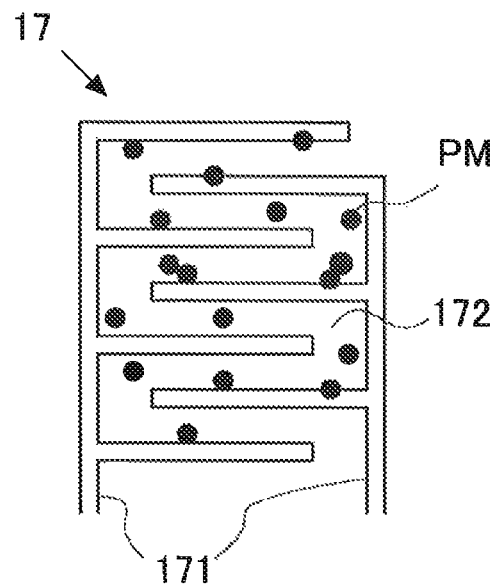
FIG. 2 is a view showing the schematic construction of a PM sensor.

Here, FIG. 2 is a schematic construction view of the PM sensor 17. The PM sensor 17 is a sensor that outputs an electrical signal corresponding to the amount of particulate matter deposited on itself. The PM sensor 17 is constructed to be provided with a pair of the electrodes 171, and an insulating material 172 arranged between the pair of the electrodes 171. If particulate matter adheres between the electrodes 171, the electric resistance between the electrodes 171 will change. Such a change of the electric resistance has a correlation to the amount of particulate matter in the exhaust gas, so that the amount of particulate matter in the exhaust gas can be detected based on the change of the electric resistance. This amount of particulate matter may also be a mass of particulate matter per unit time, or may also be a mass of particulate matter in a predetermined period of time. Note that the construction of the PM sensor 17 is not limited to what is shown in FIG. 2. That is, the PM sensor 17 should just be a PM sensor which serves to detect particulate matter and of which the detected value changes under the influence of the reducing agent.

Figure 3:
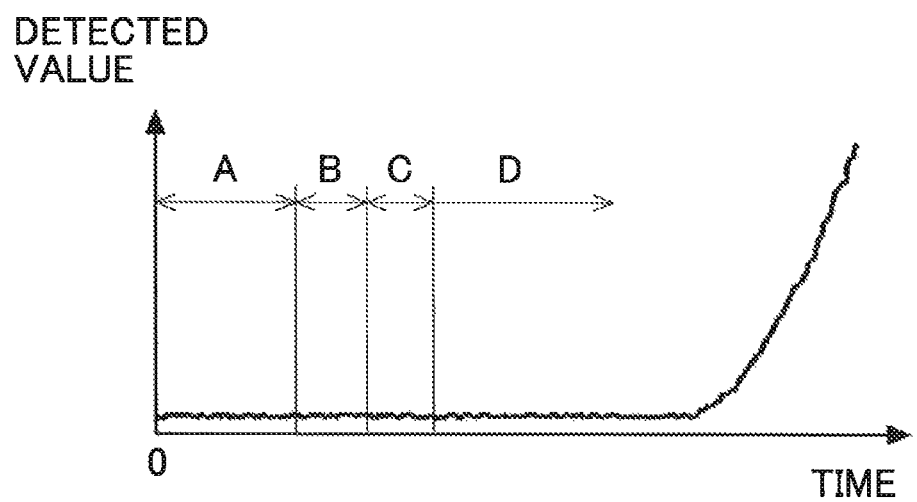
FIG. 3 is a time chart showing the change over time of a detected value of the PM sensor.

Next, FIG. 3 is a time chart showing the change over time of the detected value of the PM sensor 17. A period of time denoted by A immediately after starting of the internal combustion engine 1 is a period of time in which the water condensed in the exhaust passage 3 may adhere to the PM sensor 17. If the water adheres to the PM sensor 17, the detected value of the PM sensor 17 will change, or the PM sensor 17 will fail, and hence, in this period of time, the detection of the amount of particulate matter by means of the PM sensor 17 is not carried out.

In a period of time denoted by B after the period of time denoted by A, processing to remove the particulate matter having adhered to the PM sensor 17 at the time of the last operation of the internal combustion engine 1 is carried out. This processing is carried out by raising the temperature of the PM sensor 17 to a temperature at which the particulate matter is oxidized. In this period of time denoted by B, too, the detection of the amount of particulate matter by means of the PM sensor 17 is not carried out.

A period of time denoted by C after the period of time denoted by B is a period of time required for the temperature of the PM sensor 17 to become a temperature suitable for the detection of particulate matter. That is, the temperature of the PM sensor 17 becomes higher than the temperature suitable for the detection of particulate matter in the period of time denoted by B, so it is waited until the temperature of the PM sensor 17 drops to reach the temperature suitable for the detection of particulate matter. In this period of time denoted by C, too, the detection of the amount of particulate matter by means of the PM sensor 17 is not carried out.

Then, the detection of particulate matter is carried out in a period of time denoted by D after the period of time denoted by C. Here, note that even in the period of time denoted by D, the detected value of the PM sensor 17 does not increase until a certain amount of particulate matter accumulates or deposits on the PM sensor 17. That is, the detected value begins to increase from a point in time at which a certain amount of particulate matter accumulates so that an electric current comes to flow between the electrodes 171. Thereafter, the detected value increases according to the amount of particulate matter in the exhaust gas.

Here, the PM sensor 17 is arranged at a location downstream of the filter 5. For that reason, particulate matter, which has passed through the filter 5 without being trapped by the filter 5, adheres to the PM sensor 17. Accordingly, the amount of particulate matter deposited in the PM sensor 17 becomes an amount which corresponds to an integrated value of the amount of the particulate matter having passed through the filter 5.

Figure 4:
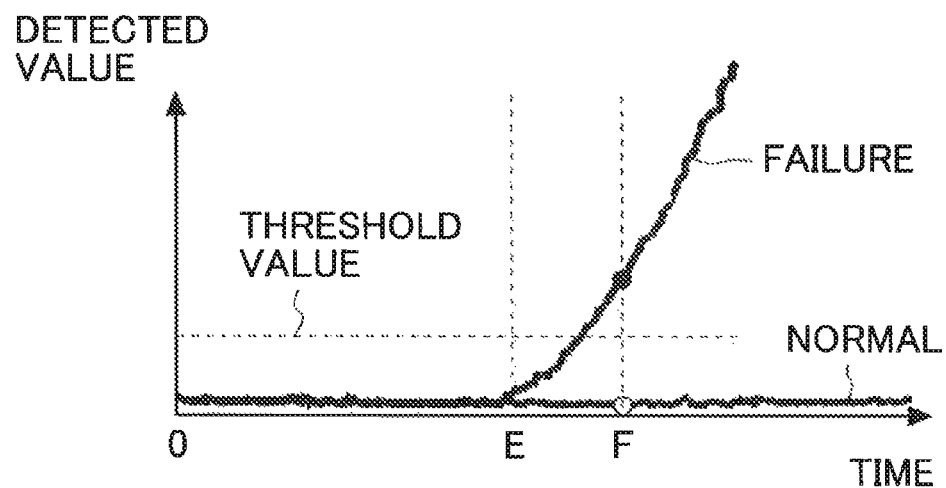
FIG. 4 is a time chart showing the change over time of the detected value of the PM sensor in the case of normal operation of a filter and in the case of a failure of the filter.

Here, FIG. 4 is a time chart showing the change over time of the detected value of the PM sensor 17 in the case of normal operation of the filter 5 and in the case of a failure of the filter 5. In cases where the filter 5 is in failure, particulate matter accumulates on the PM sensor 17 in an early period of time, so a point in time E at which the detected value of the PM sensor 17 begins to increase becomes earlier, as compared with the case in which the filter 5 is normal. For this reason, for example, if the detected value at the time when a predetermined period of time F has elapsed after the starting of the internal combustion engine 1 is equal to or more than a threshold value, it can be determined that the filter 5 is in failure. This predetermined period of time F is a period of time in which if the filter 5 is normal, the detected value of the PM sensor 17 will not increase, and whereas if the filter 5 is in failure, the detected value of the PM sensor 17 will increase. This predetermined period of time F is obtained through experiments, etc. In addition, the threshold value has also been obtained, through experiments or the like, as a lower limit value of the detected value of the PM sensor 17 at the time when the filter 5 is in failure.

However, it can also be considered that the PM sensor 17 is arranged at a location downstream of the filter 5 and upstream of the NOx catalyst 7. But, if the PM sensor 17 is arranged in such a position, the distance from the filter 5 to the PM sensor 17 will become short. For this reason, there is a fear that the particulate matter having passed through a cracked or split part of the filter 5 may arrive at areas surrounding the PM sensor 17 without being dispersed into the exhaust gas. As a result, depending on the position in which the filter 5 has cracked or split, particulate matter hardly adheres to the PM sensor 17, and hence, there is a fear that particulate matter may not be detected, and the accuracy of failure determination may be decreased.

In contrast to this, in this embodiment, the PM sensor 17 is arranged at the downstream side of the NOx catalyst 7, so the distance from the filter 5 to the PM sensor 17 is long. For this reason, the particulate matter having passed through the filter 5 disperses in the exhaust gas in the areas surrounding the PM sensor 17. Accordingly, the particulate matter can be detected without depending upon the cracked or split position of the filter 5. However, because the PM sensor 17 is arranged at the downstream side of the injection valve 6, there is a fear that the reducing agent injected from the injection valve 6 may adhere to the PM sensor 17. Such a reducing agent adhering to the PM sensor 17 is, for example, urea and its intermediate products (biuret, cyanuric acid) ranging from urea to ammonia. Thus, when the reducing agent adheres to the PM sensor 17, there is a fear that the detected value of the PM sensor 17 may change.

Figure 5:
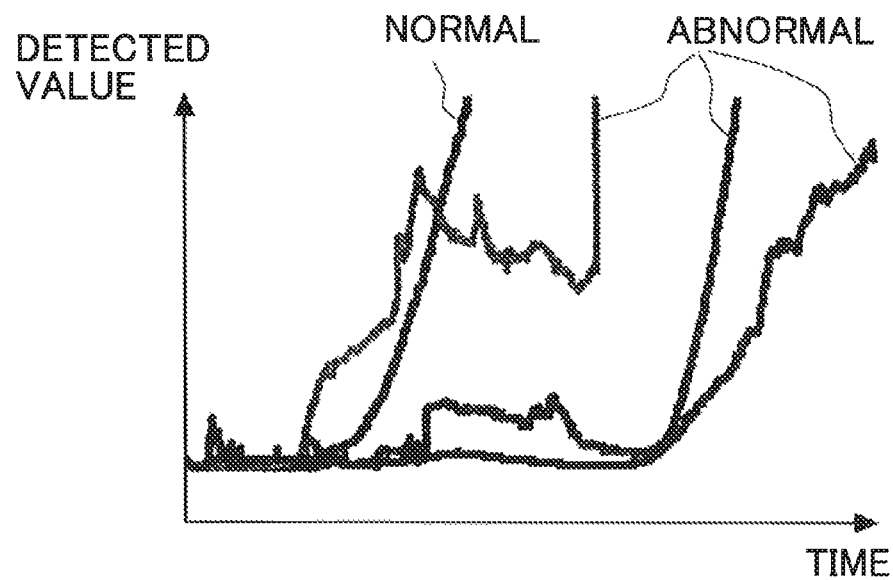
FIG. 5 is a time chart showing the change over time of the detected value of the PM sensor in the case of the detected value being normal and in the case of the detected value being abnormal.

Here, FIG. 5 is a time chart showing the change over time of the detected value of the PM sensor 17 in the case of the detected value being normal and in the case of the detected value being abnormal. The abnormal detected value can be set as a detected value at the time when the reducing agent has adhered to the PM sensor 17.

The normal detected value is a detected value which increases with the passage of time. That is, the detected value increases according to the amount of particulate matter having adhered to the PM sensor 17. On the other hand, the abnormal detected value may not only increase, but also decrease. Here, when the above-mentioned intermediate products have adhered to and deposited on the PM sensor 17 so that they become equal to or more than a predetermined amount, the detected value of the PM sensor 17 increases as in the case where particulate matter has accumulated. Here, biuret, which is an intermediate product, is generated at temperatures of 132 to 190 degrees C., and vaporizes when the temperature thereof becomes higher than those temperatures. In addition, cyanuric acid, which is also an intermediate product, is generated at temperatures of 190 to 360 degree C., and vaporizes when the temperature thereof becomes higher than those temperatures. Thus, as compared with particulate matter, the intermediate products vaporize at low temperatures. For this reason, the intermediate products having adhered to the PM sensor 17 vaporize when the temperature of the exhaust gas of the internal combustion engine 1 is high. As a result, the amount of accumulation of the intermediate products decreases, so the detected value of the PM sensor 17 also decreases. This is a phenomenon that does not occur when only the particulate matter has accumulated or deposited on the PM sensor 17.

In addition, when the intermediate products adhere to and deposit on a cover of the PM sensor 17, there is a fear that the cover may be closed or blocked. When this cover is closed or blocked with the intermediate products, it becomes impossible for particulate matter to arrive at the electrodes 171, so the particulate matter is no longer detected. For that reason, there is also a fear that the accuracy in failure determination of the filter 5 may become low.

In this manner, when the reducing agent passes through the NOx catalyst 7, there is a fear that the failure determination of the filter 5 may become difficult. By taking into consideration that $NH_3$ is generally generated from urea water through thermal decomposition and hydrolysis, the following three factors can be considered as the cause of the fact that the reducing agent passes through the NOx catalyst 7.

(1) The temperature of the NOx catalyst 7 or the temperature of the exhaust gas is low. That is, when the temperature of the exhaust gas or the NOx catalyst 7 is low, the reaction of the reducing agent such as thermal decomposition thereof will take a relatively long time, so that the reducing agent will pass through the NOx catalyst 7 before the reaction of the reducing agent is completed.

(2) The flow rate of the exhaust gas passing through the NOx catalyst 7 is large. Here, note that the flow speed of the exhaust gas passing through the NOx catalyst 7 may instead be fast. That is, when the flow rate of the exhaust gas is large, a period of time for the reducing agent to be in contact with the NOx catalyst 7 becomes short, so that the reducing agent will pass through the NOx catalyst 7 before the reaction of the reducing agent is completed.

(3) The amount of the $NH_3$ having adhered to the NOx catalyst 7 is large. Here, note that the rate of adsorption of $NH_3$ may instead be high. The rate of adsorption of $NH_3$ is a ratio of the amount of the $NH_3$ having adhered to the NOx catalyst 7 with respect to a maximum amount of $NH_3$ which can be adsorbed to the NOx catalyst 7. That is, the larger the amount of the $NH_3$ having adhered to the NOx catalyst 7, the more difficult it becomes for hydrolysis to proceed, so that the reducing agent will pass through the NOx catalyst 7 before the reaction of the reducing agent is completed.

The above-mentioned factors (1) and (2) are phenomena which occur when the reaction time is short or insufficient, and the above-mentioned factor (3) is a phenomenon which occurs due to a large amount of adsorption of $NH_3$. Then, the following measures to be taken for these factors (1), (2) and (3) can be considered.

(1) In cases where the temperature of the NOx catalyst 7 or the temperature of the exhaust gas is low, the amount of the supply of the reducing agent is decreased.

(2) In cases where the flow rate of the exhaust gas is large, or in cases where the flow speed of the exhaust gas is high, a necessary minimum amount of reducing agent is supplied. Here, note that the case where the flow rate of the exhaust gas is large, or the case where the flow speed of the exhaust gas is high, may also be replaced with the time in which the vehicle is in acceleration.

(3) In cases where the amount of adsorption of $NH_3$ is large, or in cases where the adsorption rate of $NH_3$ is high, a necessary minimum of reducing agent is supplied.

On the other hand, in this embodiment, an amount of the reducing agent which will arrive at the PM sensor 17 is calculated, for example, based on at least one of the following conditions; that is, the flow rate of the exhaust gas or the flow speed of the exhaust gas, passing through the NOx catalyst 7; the temperature of the NOx catalyst 7 or the temperature of the exhaust gas; and the adsorption rate of $NH_3$ in the NOx catalyst 7 or the amount of adsorption of $NH_3$. Then, in cases where the amount of the reducing agent arriving at the PM sensor 17 is equal to or larger than the threshold value, the supply of the reducing agent is prohibited. That is, only in cases where the amount of the reducing agent arriving at the PM sensor 17 is less than the threshold value, the reducing agent is supplied. This threshold value can be beforehand obtained through experiments, etc., as a value at the time when the influence exerted on the detected value of the PM sensor 17 exceeds the allowable range. Thus, in this embodiment, the ECU 10, which prohibits the supply of the reducing agent, corresponds to a controller in the present invention.

Figure 6:
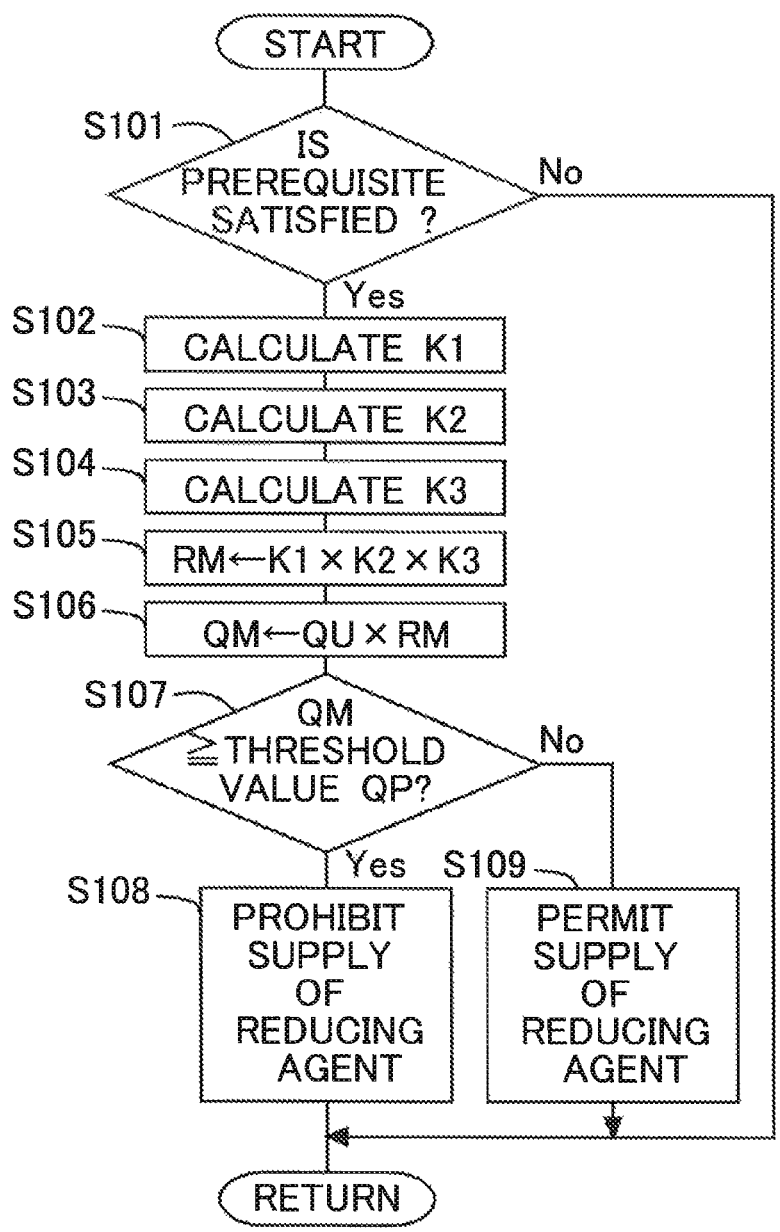
FIG. 6 is a flow chart showing a flow to prohibit the supply of the reducing agent according to a first embodiment of the present invention.

FIG. 6 is a flow chart showing a flow or routine to prohibit the supply of the reducing agent according to this first embodiment of the present invention. This routine is carried out by means of the ECU 10 at each predetermined time interval.

In step S101, it is determined whether a prerequisite for supplying the reducing agent holds. In this step, it is determined whether it is in a state capable of supplying the reducing agent.

For example, when the various kinds of sensors are normal, a determination is made that the prerequisite for supplying the reducing agent holds. Whether the various kinds of sensors are normal or abnormal can be determined by means of well-known techniques. In addition, for example, when the operating state of the internal combustion engine 1 is an operating state suitable for the supply of the reducing agent, it is determined that the prerequisite for supplying the reducing agent is satisfied. In cases where an affirmative determination is made in step S101, the routine advances to step S102, whereas in cases where a negative determination is made, this routine is ended.

In step S102, a first coefficient K1 is calculated based on the flow rate of the exhaust gas passing through the NOx catalyst 7. This first coefficient K1 is a value which represents the proportion of an amount of the reducing agent, which passes through the NOx catalyst 7 due to a cause of a large flow rate of the exhaust gas, with respect to an amount of the reducing agent which flows into the NOx catalyst 7. Here, note that the first coefficient K1 may be calculated based on the flow speed of the exhaust gas passing through the NOx catalyst 7, instead of using the flow rate of the exhaust gas passing through the NOx catalyst 7. In addition, the flow rate of the exhaust gas passing through the NOx catalyst 7 may also be replaced with the flow rate of the exhaust gas or the flow speed of the exhaust gas flowing through the exhaust passage 3. The flow rate or the flow speed of the exhaust gas can be calculated based on the amount of intake air detected by the air flow meter 11.

Figure 7:
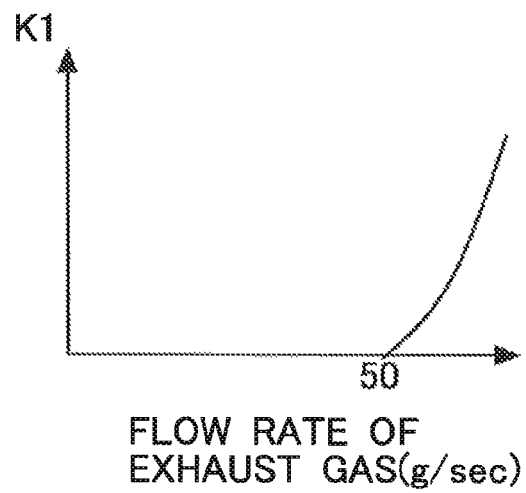
FIG. 7 is a view showing the relation between the flow rate of an exhaust gas passing through an NOx catalyst and a first coefficient K1.

Here, FIG. 7 is a view showing the relation between the flow rate of the exhaust gas passing through the NOx catalyst 7 and the first coefficient K1. Note that even if the flow rate of the exhaust gas is replaced with the flow speed of the exhaust gas, the same relation will result. Here, it is assumed that the reducing agent does not pass through the NOx catalyst 7 until the flow rate of the exhaust gas becomes 50 g/s, for example, and that the first coefficient K1 during such a period of time is a fixed value. Then, when the flow rate of the exhaust gas becomes 50 g/s or more, the first coefficient K1 will increase in accordance with an increase in the flow rate of the exhaust gas. That is, the larger the flow rate of the exhaust gas, the more it becomes easy for the reducing agent to pass through the NOx catalyst 7. For this reason, the larger the flow rate of the exhaust gas, the larger becomes the amount of the reducing agent passing through the NOx catalyst 7, so that the first coefficient K1 accordingly becomes larger. This relation has been beforehand obtained through experiments, etc., and stored in the ECU 10.

In step S103, a second coefficient K2 is calculated based on the temperature of the NOx catalyst 7. This second coefficient K2 is a value which represents the proportion of an amount of the reducing agent, which passes through the NOx catalyst 7 due to a cause of a low temperature of the NOx catalyst 7, with respect to the amount of the reducing agent which flows into the NOx catalyst 7. Here, note that the second coefficient K2 may be calculated based on the temperature of the exhaust gas, in place of the temperature of the NOx catalyst 7. The temperature of the exhaust gas may also be the temperature of the exhaust gas at the downstream side of the NOx catalyst 7, or may be the temperature of the exhaust gas which passes through the NOx catalyst 7. In addition, the temperature of the NOx catalyst 7 may also be a temperature detected by the third exhaust gas temperature sensor 14. Moreover, provision may be made for a sensor which serves to detect the temperature of the NOx catalyst 7, so that the temperature of the NOx catalyst 7 can be detected directly.

Figure 8:
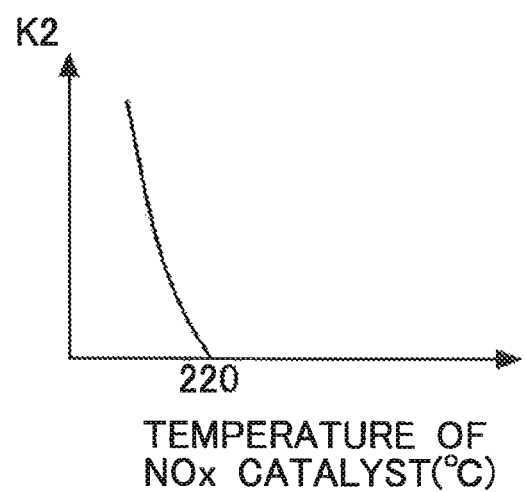
FIG. 8 is a view showing the relation between the temperature of the NOx catalyst and a second coefficient K2.

Here, FIG. 8 is a view showing the relation between the temperature of the NOx catalyst 7 and the second coefficient K2. Note that even if the temperature of the NOx catalyst 7 is replaced with the temperature of the exhaust gas, the same relation will result. When the temperature of the NOx catalyst 7 becomes equal to or higher than 220 degrees C., for example, the reaction of the reducing agent will be facilitated by the fact that the temperature of the NOx catalyst 7 is high to a sufficient extent. For this reason, it is assumed that the reducing agent does not pass through the NOx catalyst 7 at temperatures of 220 degrees C. or higher, and that the second coefficient K2 during such a period of time (i.e., at these temperatures) is a fixed value. Then, when the temperature of the NOx catalyst 7 becomes less than 220 degrees C., the second coefficient K2 becomes larger in accordance with the decreasing or lowering temperature of the NOx catalyst 7. That is, the lower the temperature of the NOx catalyst 7, the more it becomes easy for the reducing agent to pass through the NOx catalyst 7. For this reason, the lower the temperature of the NOx catalyst 7, the larger becomes the amount of the reducing agent passing through the NOx catalyst 7, so that the second coefficient K2 accordingly becomes larger. This relation has been beforehand obtained through experiments, etc., and stored in the ECU 10.

In step S104, a third coefficient K3 is calculated based on the adsorption rate of $NH_3$ in the NOx catalyst 7. This third coefficient K3 is a value which represents the proportion of an amount of the reducing agent, which passes through the NOx catalyst 7 due to a cause of a high adsorption rate of $NH_3$ in the NOx catalyst 7, with respect to the amount of the reducing agent which flows into the NOx catalyst 7. The adsorption rate of $NH_3$ in the NOx catalyst 7 is a value which is obtained by dividing an amount of $NH_3$ having adsorbed to the NOx catalyst 7 by a maximum amount of $NH_3$ which can be adsorbed by the NOx catalyst 7. The amount of $NH_3$ having adsorbed to the NOx catalyst 7 can be obtained, for example, based on the amount of the supply of the reducing agent, the temperature of the NOx catalyst 7, the flow rate of the exhaust gas, etc. In addition, the maximum amount of $NH_3$ which can be adsorbed by the NOx catalyst 7 changes according to the temperature of the NOx catalyst 7 and the extent of the deterioration of the NOx catalyst 7, for example. These relations can be obtained through experiments, etc., in advance. Here, note that the adsorption rate of $NH_3$ in the NOx catalyst 7 can also be obtained by means of well-known techniques.

Figure 9:
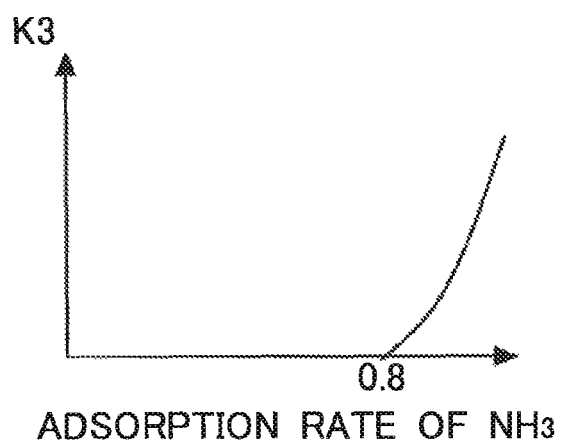
FIG. 9 is a view showing the relation between the adsorption rate of $NH_3$ in the NOx catalyst and a third coefficient K3.

Here, FIG. 9 is a view showing the relation between the adsorption rate of $NH_3$ in the NOx catalyst 7 and the third coefficient K3. Note that even if the adsorption rate of $NH_3$ is replaced with the amount of adsorption of $NH_3$, the same relation will result. Here, it is assumed that the reducing agent does not pass through the NOx catalyst 7 until the adsorption rate of $NH_3$ in the NOx catalyst 7 becomes 0.8, for example, and that the third coefficient K3 during such a period of time (i.e. below this adsorption rate) is a fixed value. Then, when the adsorption rate of $NH_3$ in the NOx catalyst 7 becomes 0.8 or more, for example, the third coefficient K3 will increase in accordance with an increase in the adsorption rate of $NH_3$. That is, the higher the adsorption rate of $NH_3$, the more it becomes easy for the reducing agent to pass though the NOx catalyst 7. For this reason, the higher the adsorption rate of $NH_3$, the larger becomes the amount of the reducing agent passing through the NOx catalyst 7, so that the third coefficient K3 accordingly becomes larger. This relation has been beforehand obtained through experiments, etc., and stored in the ECU 10. In addition, the relation between the amount of the adsorption of $NH_3$ in the NOx catalyst 7 and the third coefficient K3 may also have been obtained through experiments, etc., and stored in the ECU 10.

In step S105, a pass through coefficient RM is calculated. The pass through coefficient RM is a value which is obtained by multiplying the first coefficient K1 by the second coefficient K2 and the third coefficient K3. That is, the pass through coefficient RM is a value which represents the proportion of the amount of the reducing agent passing through the NOx catalyst 7 with respect to the amount of the reducing agent flowing into the NOx catalyst 7.

In step S106, an estimated amount of generation QM is calculated by multiplying an amount of supply QU of the reducing agent by the pass through coefficient RM calculated in step S105. The estimated amount of generation QM is an estimated value of the amount of the reducing agent passing through the NOx catalyst 7. For the amount of supply QU of the reducing agent, there can be used a command value which is calculated by the ECU 10. The amount of supply QU of the reducing agent is set to a value which corresponds to an amount of NOx in the exhaust gas, for example. The amount of NOx in the exhaust gas can be estimated based on the operating state of the internal combustion engine 1.

In step S107, it is determined whether the estimated amount of generation QM is equal to or larger than a threshold value QP. This threshold value QP is an amount of the reducing agent which passes through the NOx catalyst 7, and is an amount of the reducing agent at the time when an influence of the reducing agent exerted on the detected value of the PM sensor 17 exceeds an allowable range. That is, when the estimated amount of generation QM becomes equal to or larger than the threshold value QP, the accuracy of the failure determination of the filter 5 will become low due to the influence of the reducing agent having adhered to the PM sensor 17.

In cases where an affirmative determination is made in step S107, the routine advances to step S108, whereas in cases where a negative determination is made, the routine advances to step S109.

In step S108, the supply of the reducing agent is prohibited. That is, when the reducing agent is supplied, the detected value of the PM sensor 17 will be changed due to the reducing agent which passes through the NOx catalyst 7, and hence, the supply of the reducing agent is prohibited.

In step S109, the supply of the reducing agent is permitted. That is, because there is almost no reducing agent which passes through the NOx catalyst 7, the detected value of the PM sensor is not caused to change by the reducing agent.

Here, note that in the flow shown in FIG. 6, the pass through coefficient RM is calculated by the use of all of the first coefficient K1, the second coefficient K2 and the third coefficient K3, but any one of these coefficients may instead be used as the pass through coefficient RM. In addition, the pass through coefficient RM may also be calculated by multiplying any two of these coefficients with each other.

In addition, although in this embodiment, it is determined, by the use of the pass through coefficient RM, whether the supply of the reducing agent is prohibited or not, such a determination can also be made without using the pass through coefficient RM, the first coefficient K1, the second coefficient K2, and the third coefficient K3. That is, in cases where the amount of the reducing agent passing through the NOx catalyst 7 is equal to or larger than the threshold value, the supply of the reducing agent should be prohibited. In this case, the above-mentioned steps S102 through S106 are unnecessary. Then, in step S107, it is determined whether the amount of the reducing agent passing through the NOx catalyst 7 is equal to or larger than the threshold value. Similarly, in step S107, for example, it may be determined whether at least one of the following conditions is satisfied. That is, the flow rate of the exhaust gas or the flow speed of the exhaust gas passing through the NOx catalyst 7 is equal to or larger than a threshold value; the temperature of the NOx catalyst 7 or the temperature of the exhaust gas is equal to or less than a threshold value; and the adsorption rate of $NH_3$ or the amount of adsorption of $NH_3$ in the NOx catalyst 7 is equal to or larger than a threshold value. These threshold values have been beforehand obtained through experiments, etc., as values, respectively, at the time when the influence exerted on the detected value of the PM sensor 17 exceeds the allowable range.

As described above, according to this embodiment, in cases where there is a fear that the accuracy of the detected value of the PM sensor 17 may become low due to the reducing agent which passes through the NOx catalyst 7, the supply of the reducing agent can be prohibited. By doing so, it is possible to suppress the detected value of the PM sensor 17 from being changed due to the reducing agent, thus making it possible to suppress a reduction in the accuracy of the failure determination of the filter 5.

Second Embodiment

In the above-mentioned flow shown in FIG. 6, when the estimated amount of generation QM is equal to or larger than its threshold value, the supply of the reducing agent is prohibited. This can be said that when the amount of reducing agent passing through the NOx catalyst 7 exceeds the allowable range, the supply of the reducing agent is prohibited. In contrast to this, in this second embodiment, in cases where reducing agent passes through the NOx catalyst 7, the supply of the reducing agent is prohibited without regard to the amount of the reducing agent passing through the NOx catalyst 7. For example, when at least one of the following conditions is satisfied, the supply of the reducing agent is prohibited. That is, the flow rate of the exhaust gas or the flow speed of the exhaust gas passing through the NOx catalyst 7 is equal to or larger than its threshold value; the temperature of the NOx catalyst 7 or the temperature of the exhaust gas is equal to or less than its threshold value; and the adsorption rate of $NH_3$ or the amount of adsorption of $NH_3$ in the NOx catalyst 7 is equal to or larger than its threshold value. These threshold values are set as values at which the reducing agent passes through the NOx catalyst 7. The other devices, parts and so on are the same as those in the first embodiment, so the explanation thereof is omitted.

Figure 10:
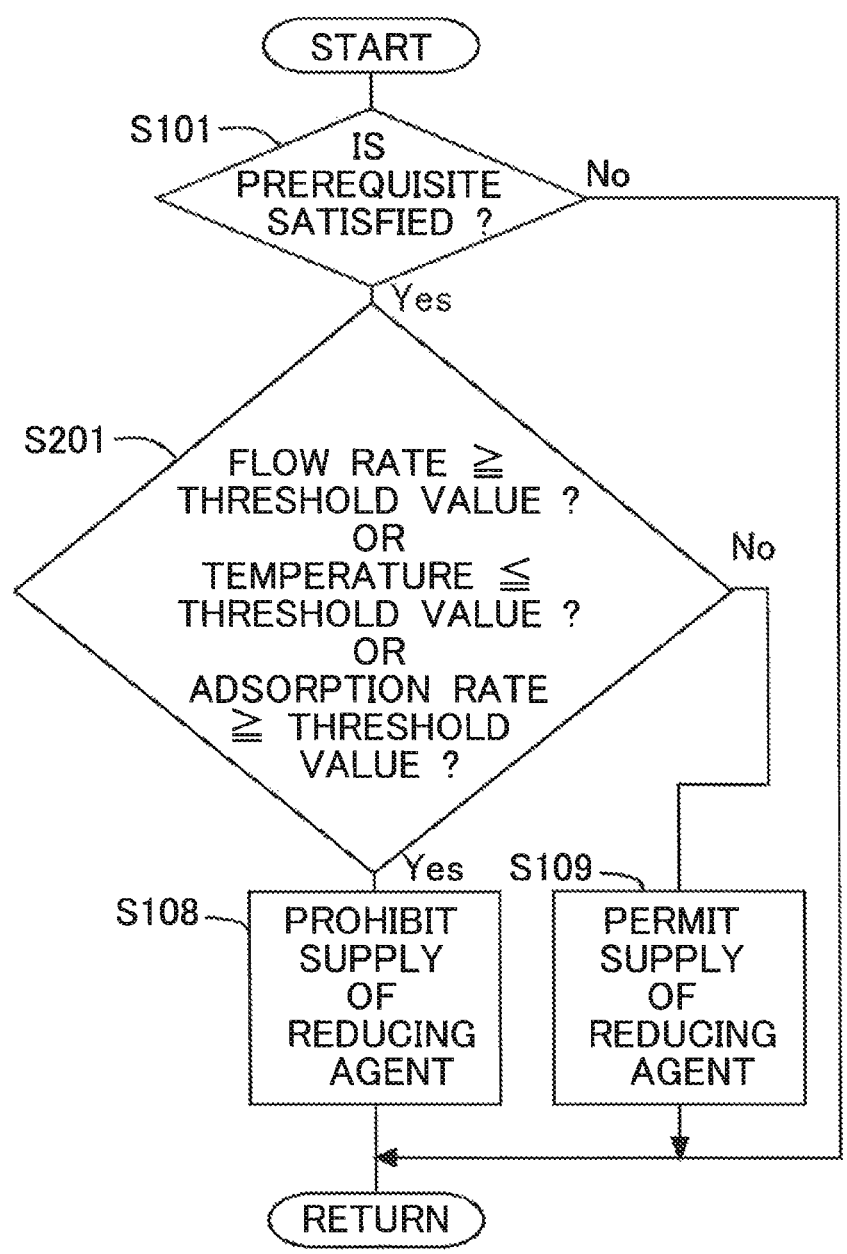
FIG. 10 is a flow chart showing a flow to prohibit the supply of the reducing agent according to a second embodiment of the present invention.

FIG. 10 is a flow chart showing a flow or routine to prohibit the supply of the reducing agent according to this second embodiment of the present invention. This routine is carried out by means of the ECU 10 at each predetermined time interval. Here, note that for those steps in which the same processing as in the flow shown in FIG. 6 is carried out, the same symbols are attached and an explanation thereof is omitted.

In cases where an affirmative determination is made in step S101, the routine advances to step S201. In step S201, it is determined whether at least one of the following conditions is satisfied. That is, the flow rate of the exhaust gas passing through the NOx catalyst 7 is equal to or larger than its threshold value; the temperature of the NOx catalyst 7 is equal to or less than its threshold value; and the adsorption rate of $NH_3$ in the NOx catalyst 7 is equal to or larger than its threshold value. These threshold values have been beforehand obtained through experiments or the like as values at which the reducing agent passes through the NOx catalyst 7. The flow rate of the exhaust gas may also be the flow speed of the exhaust gas. The temperature of the NOx catalyst 7 may also be the temperature of the exhaust gas. The adsorption rate of $NH_3$ in the NOx catalyst 7 may also be the amount of the adsorption of $NH_3$ in the NOx catalyst 7. Here, note that in step S201, it may be determined whether the reducing agent passes through the NOx catalyst 7.

Moreover, in step S201, similarly to the flow shown in FIG. 6, the first coefficient K1, the second coefficient K2, and the third coefficient K3 may be calculated, and a determination may be made as to whether the value of any of these coefficients is equal to or larger than its threshold value. In addition, a determination may also be made as to whether a value which is obtained by multiplying at least two of the first coefficient K1, the second coefficient K2 and the third coefficient K3 is equal to or larger than its threshold value. Further, a determination may also be made as to whether the pass through coefficient RM calculated in step S105 is equal to or larger than its threshold value. These threshold values have been beforehand obtained through experiments or the like as values at which the reducing agent passes through the NOx catalyst 7.

In cases where an affirmative determination is made in step S201, the routine advances to step S108, whereas in cases where a negative determination is made, the routine advances to step S109.

Here, note that in this embodiment, the ECU 10, which prohibits the supply of the reducing agent, corresponds to a controller in the present invention.

As described above, according to this embodiment, in cases where there is a fear that the accuracy of the detected value of the PM sensor 17 may become low due to the reducing agent which has passed through the NOx catalyst 7, the supply of the reducing agent can be prohibited. By doing so, it is possible to suppress the detected value of the PM sensor 17 from being changed due to the reducing agent, thus making it possible to suppress a reduction in the accuracy of the failure determination of the filter 5.

Third Embodiment

In this third embodiment, the reducing agent is supplied in such a manner that the amount of the reducing agent arriving at the PM sensor 17 is less than its threshold value. The threshold value is an amount of reducing agent at the time when the influence exerted on the detected value of the PM sensor 17 exceeds the allowable range. That is, in this embodiment, the reducing agent is supplied in such a manner that the influence exerted on the detected value of the PM sensor 17 does not exceed the allowable range. The reducing agent may be supplied in such a manner that the reducing agent does not pass through the NOx catalyst 7. The other devices, parts and so on are the same as those in the first embodiment, so the explanation thereof is omitted.

For example, the larger the flow rate of the exhaust gas passing through the NOx catalyst 7, or the higher the flow speed of the exhaust gas, the smaller the amount of the supply of the reducing agent is made. In addition, the lower the temperature of the NOx catalyst 7 or the temperature of the exhaust gas, the smaller the amount of the supply of the reducing agent is made. Moreover, the higher the adsorption rate of $NH_3$ in the NOx catalyst 7 or the larger the amount of adsorption of $NH_3$, the smaller the amount of the supply of the reducing agent is made. Here, note that in this embodiment, the ECU 10, which decreases the amount of the supply of the reducing agent, corresponds to a controller in the present invention.

Figure 11:
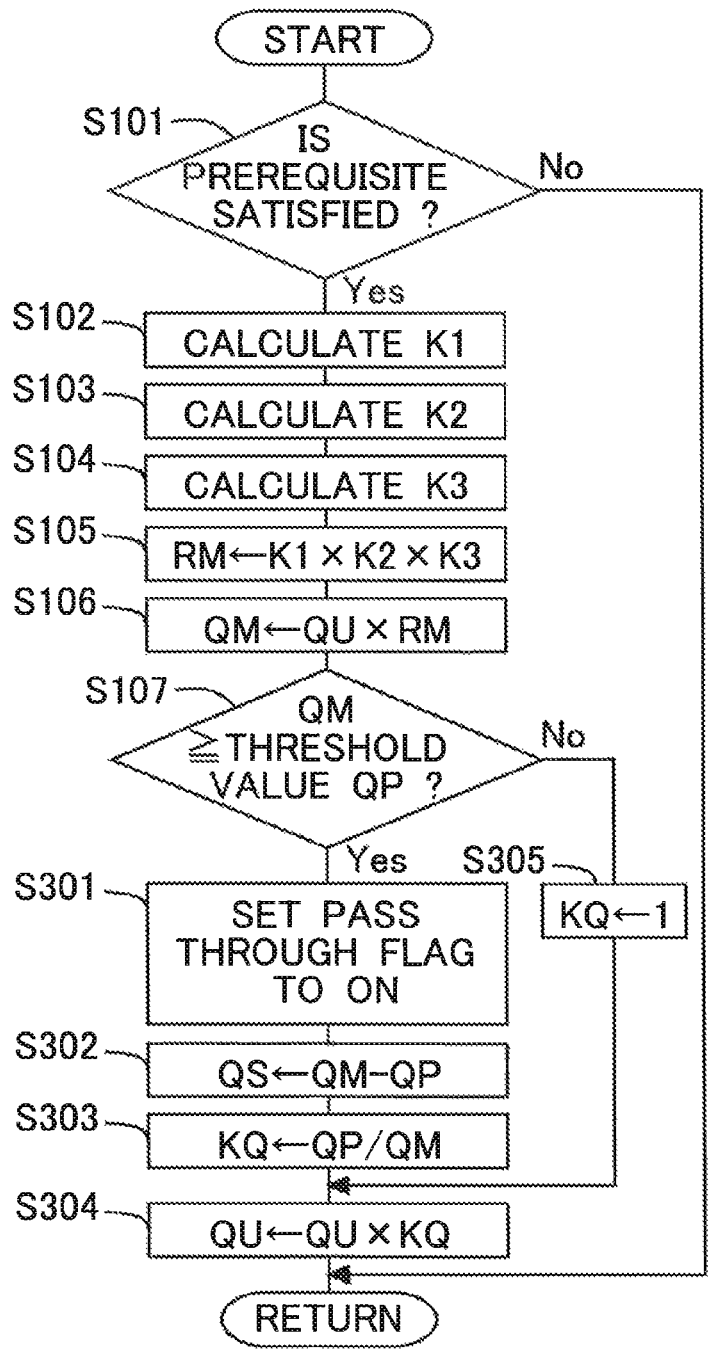
FIG. 11 is a flow chart showing a control flow for the amount of the supply of the reducing agent according to a third embodiment of the present invention.

FIG. 11 is a flow chart showing a control flow or routine for the amount of the supply of the reducing agent according to this third embodiment of the present invention. This routine is carried out by means of the ECU 10 at each predetermined time interval. Here, note that for those steps in which the same processing as in the flow shown in FIG. 6 is carried out, the same symbols are attached and an explanation thereof is omitted.

In cases where an affirmative determination is made in step S107, the routine advances to step S301, and in step S301, a pass through flag is set to on. The pass through flag is a flag which is set to on when the estimated amount of generation QM is larger than a threshold value. Here, note that an initial value of the pass through flag is off. In addition, when it is in a state where the reducing agent passes through the NOx catalyst 7, the pass through flag may be set to on. Here, note that the pass through flag is used in an embodiment to be described later, so in this embodiment, it is not necessary to set the pass through flag.

In step S302, a pass through amount QS is calculated. The pass through amount QS is a value which is obtained by subtracting the threshold value QP used in step S107 from the estimated amount of generation QM. That is, an amount of the reducing agent, which has passed through the NOx catalyst 7 and which corresponds to a part of the reducing agent in excess of the allowable range, is calculated as the pass through amount QS. Here, note that the pass through amount QS is a value which is used in an embodiment to be described later, and hence, in this embodiment, it is not necessary to calculate the pass through amount QS.

In step S303, a correction coefficient KQ is calculated. The correction coefficient KQ is a coefficient for correcting the amount of supply QU of the reducing agent, and is a coefficient for carrying out a correction in such a manner that the reducing agent arriving at the PM sensor 17 falls within an allowable range. The correction coefficient KQ is a value which is obtained by dividing the threshold value QP by the estimated amount of generation QM. This correction coefficient KQ is set so that the amount of the reducing agent passing through the NOx catalyst 7 decreases up to the threshold value QP.

In step S304, a final amount of supply QU of the reducing agent is calculated by carrying out the multiplication of the amount of supply QU of the reducing agent by the correction coefficient KQ. That is, the new amount of supply QU of the reducing agent calculated in step S304 serves as an amount of reducing agent to be actually supplied.

On the other hand, in cases where a negative determination is made in step S107, the routine proceeds to step S305, in which 1 is assigned to the correction coefficient KQ. That is, the amount of supply QU of the reducing agent is kept from changing.

Thus, the reducing agent can be supplied while suppressing the amount of the reducing agent passing through the NOx catalyst 7 within the allowable range, thus making it possible to suppress a reduction in the removal rate of NOx. In addition, it is possible to suppress the detected value of the PM sensor 17 from being changed due to the reducing agent, thus making it possible to suppress a reduction in the accuracy of the failure determination of the filter 5.

Fourth Embodiment

In this fourth embodiment, an upper limit value of the amount of supply of the reducing agent is set according to the flow rate of the exhaust gas passing through the NOx catalyst 7 or the flow speed of the exhaust gas. The other devices, parts and so on are the same as those in the first embodiment, so the explanation thereof is omitted.

Here, in the third embodiment, the amount of the supply of the reducing agent is corrected based on the estimated amount of generation QM, but in this fourth embodiment, the estimated amount of generation QM is not calculated. In addition, in this embodiment, the amount of the supply of the reducing agent is not corrected, but an upper limit value of the amount of the supply thereof is instead set. For example, even in cases where an amount of reducing agent to be required is more than the upper limit value thereof, the reducing agent to be actually supplied is set to the upper limit value. That is, the amount of the supply of the reducing agent is made smaller than required. This upper limit value of the amount of the supply of the reducing agent is an upper limit value of the amount of reducing agent in which the influence exerted on the detected value of the PM sensor 17 falls within the allowable range. The relation between the amount of the supply of the reducing agent and the flow rate of the exhaust gas or the flow speed of the exhaust gas has been beforehand obtained through experiments, etc., and stored in the ECU 10. Here, note that in this embodiment, the ECU 10, which decreases the amount of the supply of the reducing agent, corresponds to a controller in the present invention.

Figure 12:
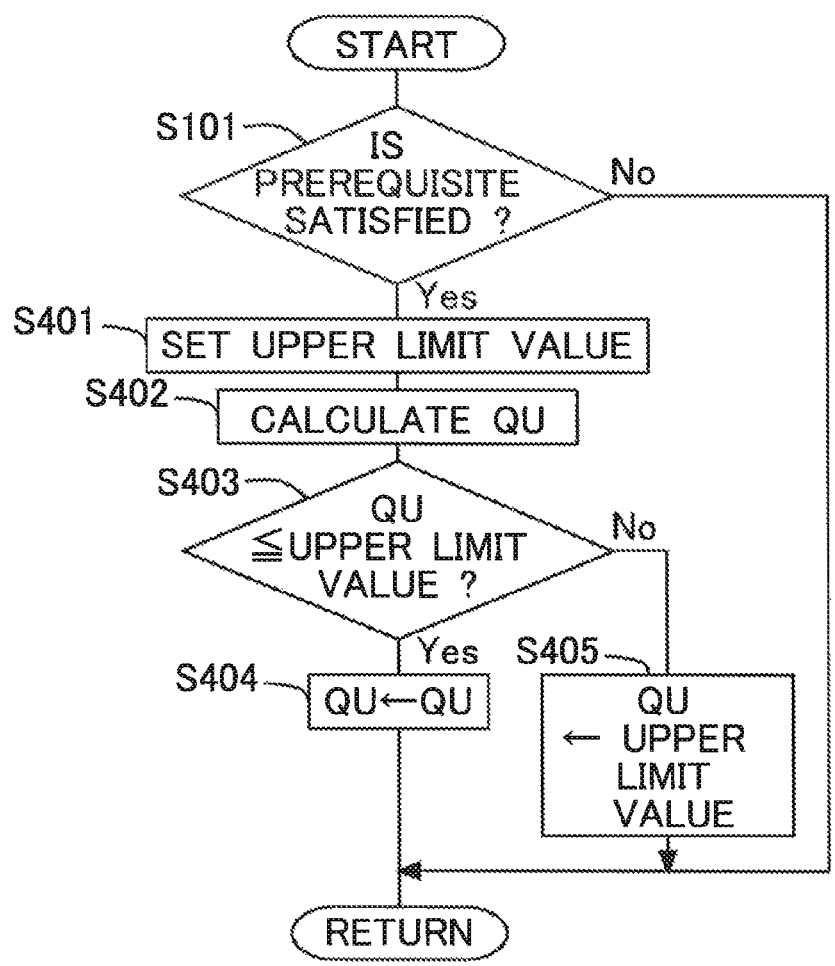
FIG. 12 is a flow chart showing a control flow for the amount of the supply of the reducing agent according to a fourth embodiment of the present invention.

FIG. 12 is a flow chart showing a control flow or routine for the amount of the supply of the reducing agent according to this fourth embodiment of the present invention. This routine is carried out by means of the ECU 10 at each predetermined time interval. Here, note that for those steps in which the same processing as in the flow shown in FIG. 6 is carried out, the same symbols are attached and an explanation thereof is omitted.

In cases where an affirmative determination is made in step S101, the routine advances to step S401. In step S401, the upper limit value of the amount of the supply of the reducing agent is set. The upper limit value of the amount of the supply of the reducing agent is obtained based on the flow rate of the exhaust gas or the flow speed of the exhaust gas. For example, the larger the flow rate of the exhaust gas, or the higher the flow speed of the exhaust gas, the smaller the upper limit value is made. Such a relation may have beforehand been obtained through experiments, etc., and made into a map.

In step S402, the amount of supply QU of the reducing agent is calculated. For the amount of supply QU of the reducing agent, there can be used a command value which is calculated by the ECU 10. The amount of supply QU of the reducing agent is set to a value which corresponds to an amount of NOx in the exhaust gas, for example.

In step S403, it is determined whether the amount of supply QU of the reducing agent calculated in step S402 is equal to or less than the upper limit value set in step S401. In cases where an affirmative determination is made in step S403, the routine advances to step S404, whereas in cases where a negative determination is made, the routine advances to step S405.

In step S404, the amount of supply QU of the reducing agent calculated in step S402 is set to be as a final amount of supply QU of the reducing agent.

In step S405, the upper limit value set in step S401 is set to be as a final amount of supply QU of the reducing agent.

Thus, even if the upper limit of the amount of the supply of the reducing agent is set in a simple manner, it is possible to suppress the reducing agent from adhering to the PM sensor 17. As a result of this, it is possible to enhance the accuracy of the failure determination of the filter 5.

Here, note that in this embodiment, the upper limit value of the amount of supply of the reducing agent is set based on the flow rate of the exhaust gas passing through the NOx catalyst 7 or the flow speed of the exhaust gas, but instead of this, the upper limit value of the amount of the supply of the reducing agent may be calculated based on the temperature of the NOx catalyst 7 or the temperature of the exhaust gas, the adsorption rate of $NH_3$ in the NOx catalyst 7, and the amount of adsorption of $NH_3$ in the NOx catalyst 7.

The relation among the temperature of the NOx catalyst 7, the temperature of the exhaust gas, the adsorption rate of $NH_3$ in the NOx catalyst 7, or the amount of adsorption of $NH_3$ in the NOx catalyst 7 and the upper limit value of the amount of the supply of the reducing agent has been beforehand obtained through experiments, etc., and stored in the ECU 10.

Fifth Embodiment

In this fifth embodiment, the reducing agent has been caused to be adsorbed to the NOx catalyst 7 in advance before the internal combustion engine becomes an operating state in which the reducing agent arrives at the PM sensor 17. The other devices, parts and so on are the same as those in the first embodiment, so the explanation thereof is omitted.

In the above-mentioned embodiments, when the internal combustion engine becomes an operating state in which the reducing agent arrives at the PM sensor 17, the amount of the supply of the reducing agent is made small, but in this fifth embodiment, the reducing agent has been caused to be adsorbed to the NOx catalyst 7 before the internal combustion engine becomes such an operating state. For example, assuming the time when the amount of intake air has increased from a value at the present point in time to a maximum extent possible, the reducing agent has been beforehand supplied in an amount corresponding to an amount of NOx which is estimated to flow into the NOx catalyst 7 during the time until the temperature of the NOx catalyst 7 goes up from a value at the present point in time to a temperature at which the reducing agent will not pass through the NOx catalyst 7. Here, note that when the amount of intake air increases, the flow rate of the exhaust gas or the flow speed of the exhaust gas also increases, so that the amount of the supply of the reducing agent is made smaller, but the temperature of the exhaust gas goes up due to the increasing amount of intake air. As a result, the temperature of the NOx catalyst 7 also goes up, thus making it difficult for the reducing agent to pass through the NOx catalyst 7. That is, when the temperature of the NOx catalyst 7 becomes sufficiently high, an amount of reducing agent corresponding to the amount of NOx can be supplied.

Accordingly, a maximum value of the temperature at which there is a fear that the reducing agent may arrive at the PM sensor 17 is calculated, and an amount of reducing agent, which should be supplied during a period of time required for the temperature of the NOx catalyst to rise from a temperature at the present point in time to the maximum value, is caused to be adsorbed to the NOx catalyst 7 in advance.

Figure 13:
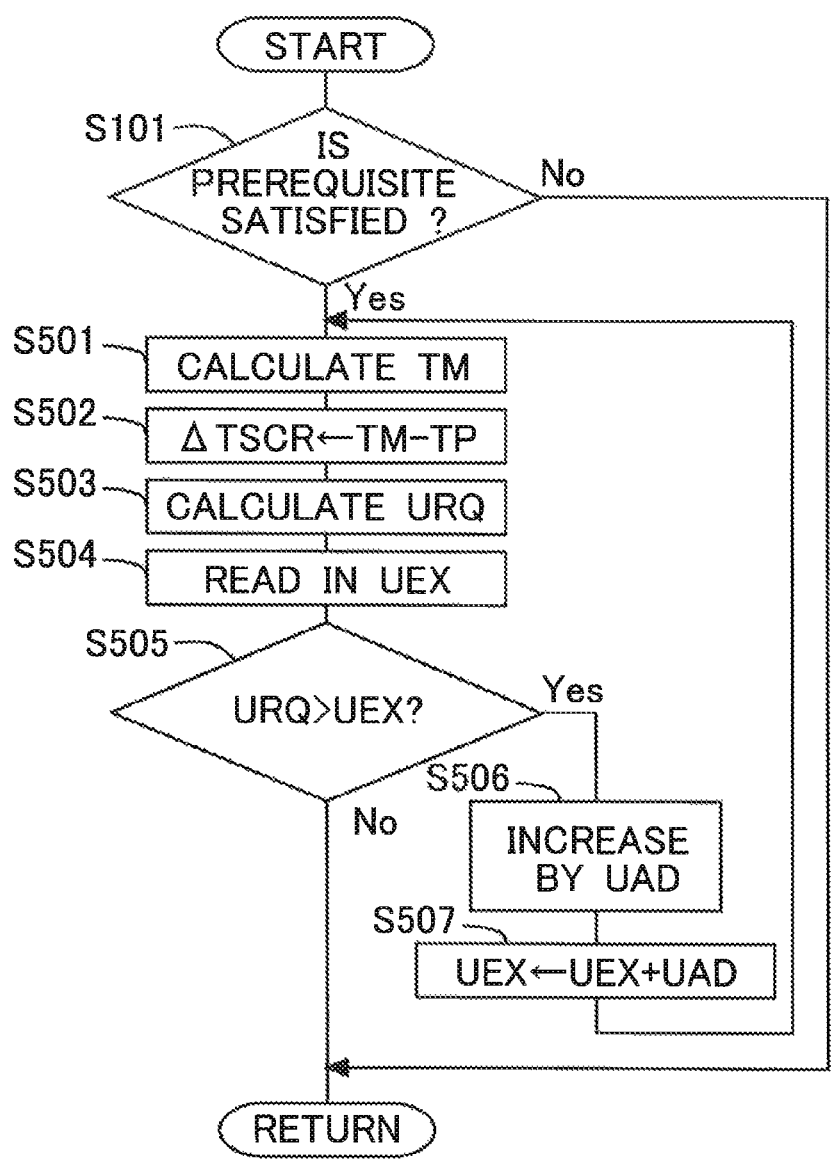
FIG. 13 is a flow chart showing a control flow for the amount of the supply of the reducing agent according to a fifth embodiment of the present invention.

FIG. 13 is a flow chart showing a control flow or routine for the amount of the supply of the reducing agent according to this fifth embodiment of the present invention. This routine is carried out by means of the ECU 10 at each predetermined time interval. Here, note that for those steps in which the same processing as in the flow shown in FIG. 6 is carried out, the same symbols are attached and an explanation thereof is omitted.

In cases where an affirmative determination is made in step S101, the routine advances to step S501. In step S501, the highest temperature TM of the NOx catalyst 7 at which the reducing agent can arrive at the PM sensor 17 is calculated. This highest temperature TM may be caused to change in accordance with the amount of intake air. Then, the highest temperature TM has been beforehand obtained through experiments, etc., made into a map and stored in the ECU 10.

In step S502, an amount of temperature increase ΔTSCR, which is a value obtained by subtracting a temperature TP of the NOx catalyst 7 at the present point in time from the highest temperature TM, is calculated. This amount of temperature increase ΔTSCR is a temperature by which at the time when the operating state of the internal combustion engine 1 has changed, the temperature of the NOx catalyst 7 has to be raised until the time when the reducing agent does not arrive at the PM sensor 17.

Figure 14:
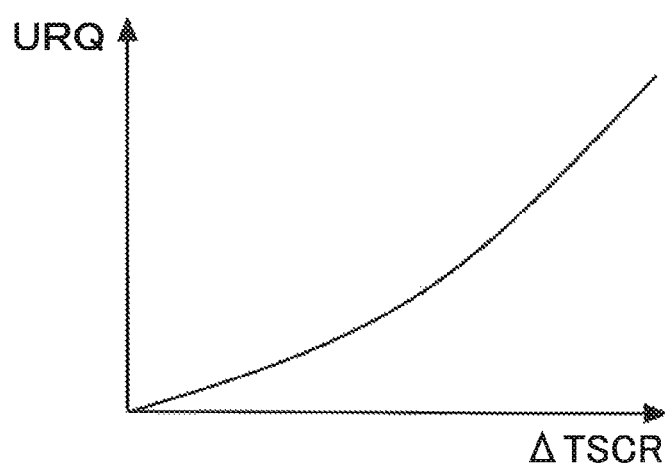
FIG. 14 is a view showing the relation between an amount of temperature increase $\Delta TSCR$ and an amount of increase URQ of $NH_3$.

In step S503, an amount of increase URQ of $NH_3$ is calculated. The amount of increase URQ of $NH_3$ is an amount of reducing agent to be added to an amount of reducing agent which is required in order to cause the NOx in the exhaust gas to be reduced. That is, it is an amount of supply of the reducing agent by which the supply of the reducing agent is caused to increase from an ordinary amount of supply. The amount of increase URQ of $NH_3$ is in correlation to the amount of temperature increase ΔTSCR calculated in step S502, and is obtained with a map shown in FIG. 14. Here, FIG. 14 is a view showing the relation between the amount of temperature increase ΔTSCR and the amount of increase URQ of $NH_3$. The larger the amount of temperature increase ΔTSCR, the longer becomes a period of time which is required for the temperature of the NOx catalyst 7 to go up to a temperature at which the reducing agent does not arrive at the PM sensor 17, and hence, the larger becomes the amount of increase URQ of $NH_3$. This amount of increase URQ of $NH_3$ can be set to be an amount of reducing agent which becomes short while the amount of the supply of the reducing agent is made smaller. The relation of FIG. 14 has been beforehand obtained through experiments, etc., made into a map, and stored in the ECU 10.

In step S504, an amount of increase UEX of $NH_3$ at the present point in time is read in.

In step S505, it is determined whether the amount of increase URQ of $NH_3$ calculated in step S503 is more than the amount of increase UEX of $NH_3$ at the present point in time read in step S504. In this step, it is determined whether it is necessary to increase the amount of the reducing agent more than that at the present point in time. That is, if the amount of increase UEX of $NH_3$ at the present point in time is sufficiently large, there will be no need to newly increase the amount of the reducing agent, and there will also be a fear that the reducing agent may be consumed without any use, as a result of which the determination of this step is made. In cases where an affirmative determination is made in step S505, the routine advances to step S506, whereas in cases where a negative determination is made, there is no need to increase the reducing agent, and hence this routine is terminated.

In step S506, the reducing agent is increased by an amount of increase UAD. This amount of increase UAD is set so that the reducing agent does not increase in a rapid manner. Here, if the amount of increase URQ of $NH_3$ is added at a time, there will be a fear that a part of the reducing agent may flow out from the NOx catalyst 7 without being adsorbed to the NOx catalyst 7. For this reason, the amount of increase UAD is decided in such a manner as to suppress the outflow of the reducing agent. Then, in cases where the amount of increase UAD is smaller than the amount of increase URQ of $NH_3$, the reducing agent is increased by the amount of increase UAD each time this routine is carried out in a plurality of times, so that the amount of increase URQ of $NH_3$ will be finally reached. This amount of increase UAD is a prescribed value, and an optimum value therefor has been beforehand obtained through experiments, etc., and stored in the ECU 10.

In step S507, a value which is obtained by adding the amount of increase UAD to the amount of increase UEX of $NH_3$ at the present point in time is newly set as an amount of increase UEX of $NH_3$ at the present point in time.

Here, note that in this embodiment, the ECU 10, which carries out the flow or routine as shown in FIG. 13, corresponds to a supply increase part in the present invention.

In this manner, a larger amount of reducing agent has been caused to be adsorbed to the NOx catalyst 7 in advance in preparation for decreasing the amount of the supply of the reducing agent. According to this, even in cases where the amount of the supply of the reducing agent is decreased, it is possible to suppress the shortage of the reducing agent, thus making it possible to suppress the reduction in the removal rate of NOx. In addition, when there is a fear that the reducing agent may arrive at the PM sensor 17, the amount of the supply of the reducing agent can be decreased, so that it is possible to suppress the detected value of the PM sensor 17 from being changed due to the influence of the reducing agent. As a result of this, it is possible to enhance the accuracy of the failure determination of the filter 5.

Sixth Embodiment

In this sixth embodiment, reference will be made to a case in which the increase in the amount of the reducing agent described in the fifth embodiment can not be carried out in time, or a case in which the reducing agent is supplied at each prescribed period or interval of time. The other devices, parts and so on are the same as those in the first embodiment, so the explanation thereof is omitted.

In general, the supply of the reducing agent is carried out at the time when an integrated value of the amount of NOx having flowed into the NOx catalyst 7 reaches a threshold value, or it is carried out at each prescribed interval of time. In cases where the supply of the reducing agent is carried out at the time when the integrated value of the amount of NOx having flowed into the NOx catalyst 7 reaches the threshold value, the reducing agent is supplied in a prescribed amount corresponding to the integrated value of the amount of NOx. In addition, in cases where the supply of the reducing agent is carried out at each prescribed period or interval of time, the reducing agent is supplied in accordance with the integrated value of the amount of NOx which has flowed into the NOx catalyst 7 in the prescribed period of time.

On the other hand, in this sixth embodiment, in cases where there is a fear that the reducing agent may arrive at the PM sensor 17, even when it comes to the time to supply the reducing agent, the supply of the reducing agent is not immediately carried out. That is, in cases where the amount of the supply of the reducing agent is made smaller than an ordinary amount of supply, even when it comes to the time to supply the reducing agent, the supply of the reducing agent is not carried out. Then, after a fear that the reducing agent may arrive at the PM sensor 17 has disappeared, the reducing agent is supplied. That is, the supply of the reducing agent is postponed. The supply of the reducing agent at this time is carried out by being increased by an amount capable of removing NOx which has flowed into the NOx catalyst 7 during a period of time in which the supply of the reducing agent is postponed. That is, the amount of the reducing agent to be supplied is decided according to the amount of NOx which has flowed into the NOx catalyst 7 from the last supply of the reducing agent to the present point in time. This may instead be such that the reducing agent is supplied in an amount corresponding to an amount of decrease of the reducing agent having adsorbed to the NOx catalyst 7.

Figure 15:
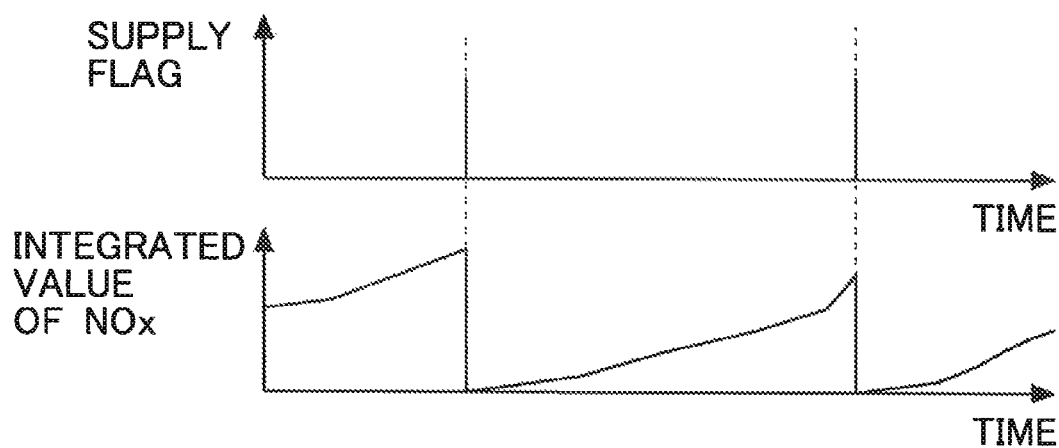
FIG. 15 is a time chart generally showing a supply flag and the change over time of an integrated value of an amount of NOx which flows into an NOx catalyst.

FIG. 15 is a time chart generally showing a supply flag and the change over time of the integrated value of the amount of NOx which flows into the NOx catalyst 7. FIG. 15 may also be a view when the amount of the supply of the reducing agent is not made small. In addition, FIG. 15 may also be a view showing a general supply time of the reducing agent. When the supply flag is set to on, the reducing agent is supplied. On the other hand, when the supply flag is off, the amount of NOx flowing into the NOx catalyst 7 is accumulated or integrated.

In FIG. 15, the supply flag is set to on at each prescribed period or interval of time. This prescribed period or interval of time has been beforehand set as a period or interval of time at which the supply of the reducing agent is required, and which is, for example, from several seconds to tens of seconds. When the supply flag is set to on, an amount of supply of the reducing agent is decided according to the integrated value of the amount of NOx at that time. That is, because a part of the reducing agent having adsorbed to the NOx catalyst 7 has been consumed by the NOx having already flowed into the NOx catalyst 7, a new amount of reducing agent is supplied so as to compensate for an amount of reducing agent thus consumed.

Here, note that when the integrated value of the amount of NOx flowing into the NOx catalyst 7 reaches the threshold value, the supply flag may be set to on so that the supply of the reducing agent is carried out.

Figure 16:
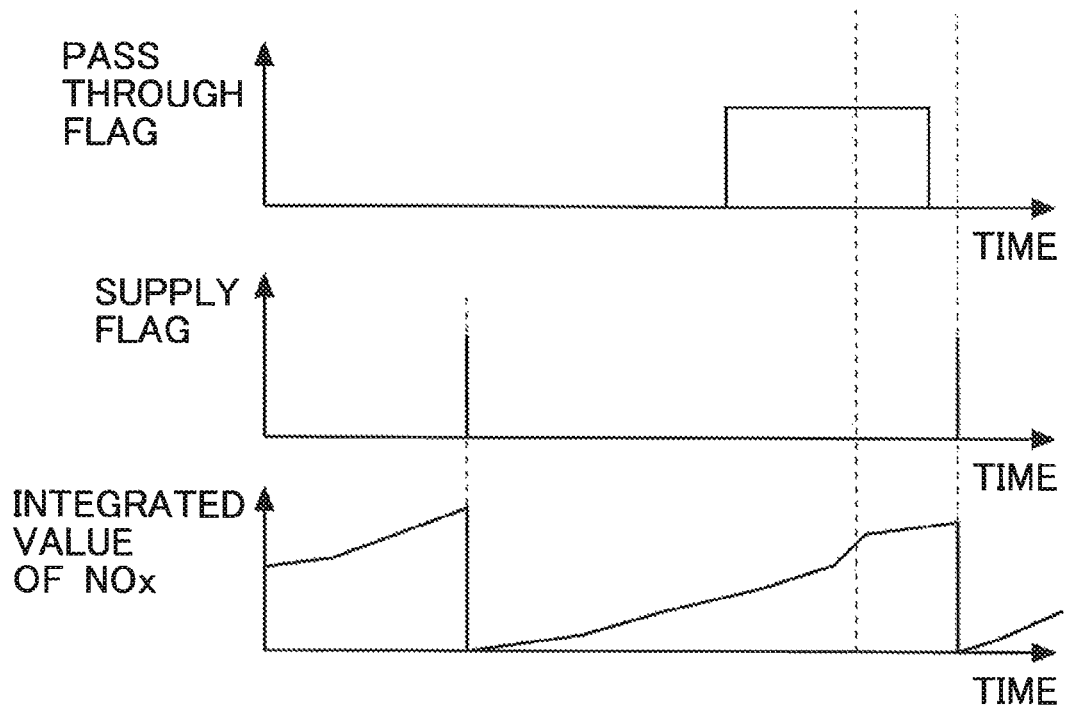
FIG. 16 is a time chart showing a supply flag and the change over time of an integrated value of an amount of NOx which flows into an NOx catalyst in cases where the supply control of the reducing agent is carried out according to a sixth embodiment of the present invention.

FIG. 16 is a time chart showing the supply flag and the change over time of the integrated value of the amount of NOx which flows into the NOx catalyst 7 in cases where the supply control of the reducing agent is carried out according to this sixth embodiment of the present invention. Here, note that when a pass through flag in FIG. 16 is on, there is a fear that the reducing agent may pass through the NOx catalyst 7. For example, when the amount of intake air is equal to or larger than a threshold value and when the temperature of the NOx catalyst 7 is less than a threshold value, the pass through flag is set to on. During the time in which this pass through flag remains on, the supply of the reducing agent is not carried out. That is, the supply of the reducing agent is postponed without setting the supply flag to on. Then, during the time in which the supply of the reducing agent has been postponed, the amount of NOx is also integrated, and at the time when the pass through flag is set to off, the supply flag is set to on, and at the same time, the reducing agent is supplied in an amount corresponding to the integrated value of the amount of NOx at this time.

Figure 17:
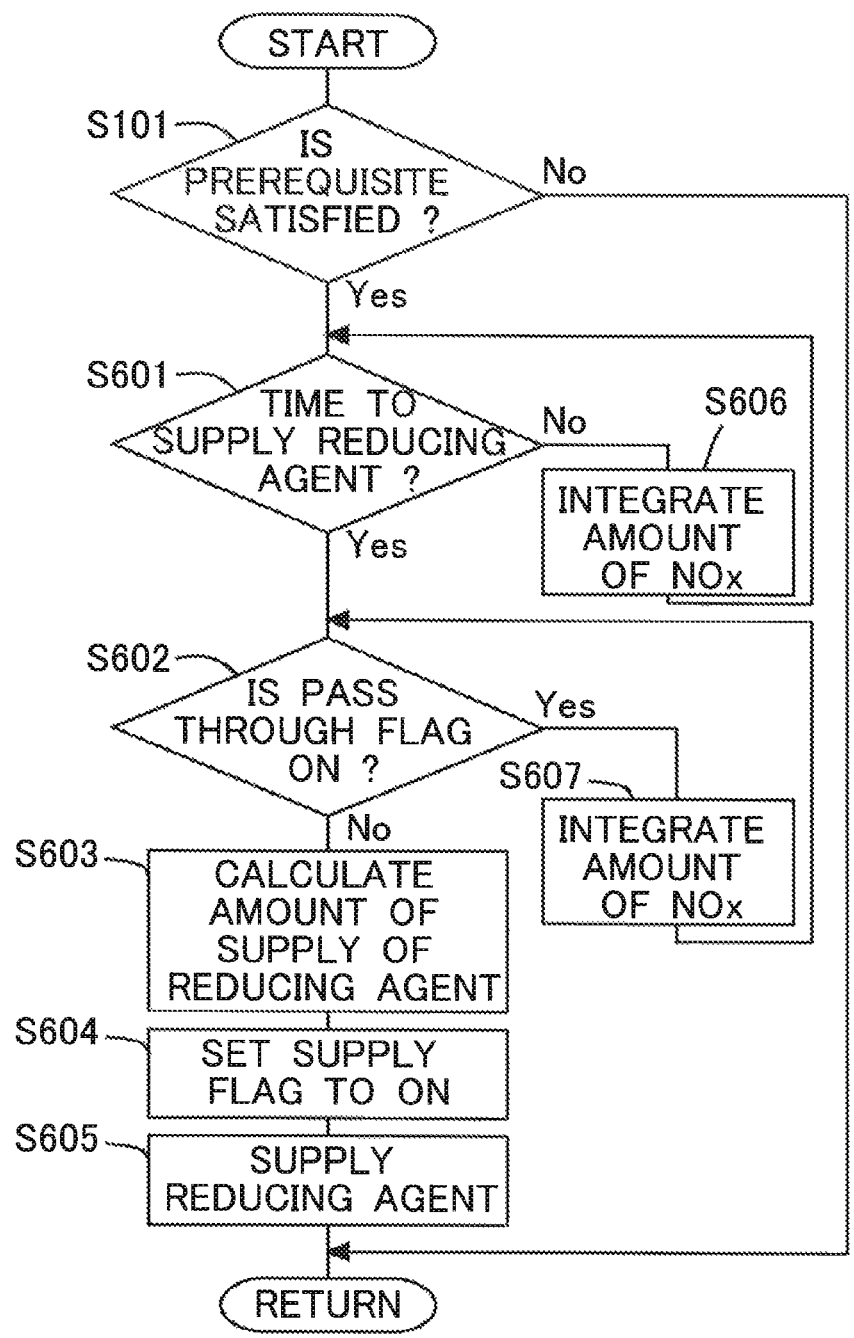
FIG. 17 is a flow chart showing a control flow for the amount of the supply of the reducing agent according to the sixth embodiment of the present invention.

FIG. 17 is a flow chart showing a control flow or routine for the amount of the supply of the reducing agent according to this sixth embodiment of the present invention. This routine is carried out by means of the ECU 10 at each predetermined time interval. Here, note that for those steps in which the same processing as in the flow shown in FIG. 6 is carried out, the same symbols are attached and an explanation thereof is omitted.

In cases where an affirmative determination is made in step S101, the routine advances to step S601. In step S601, it is determined whether it is the time to supply the reducing agent. The supply of the reducing agent is carried out at each prescribed period of time which has been set beforehand, and hence, at the time when the prescribed period of time has elapsed from the last supply of the reducing agent, it is determined that it is the time to supply the reducing agent. In cases where an affirmative determination is made in step S601, the routine advances to step S602, whereas in cases where a negative determination is made, the routine advances to step S606, in which the amount of NOx flowing into the NOx catalyst 7 is integrated. Then, after the step S606 is carried out, the routine returns to step S601. That is, the amount of NOx flowing into the NOx catalyst 7 is integrated until an affirmative determination is made in step S601.

In step S602, it is determined whether the pass through flag has been set to on. That is, it is determined whether it is in a state where the reducing agent may arrive at the PM sensor 17. For example, when at least one of the following conditions is satisfied, the pass through flag is set to on. That is, the flow rate of the exhaust gas or the flow speed of the exhaust gas passing through the NOx catalyst 7 is equal to or larger than its threshold value; the temperature of the NOx catalyst 7 or the temperature of the exhaust gas is equal to or less than its threshold value; and the adsorption rate of $NH_3$ or the amount of adsorption of $NH_3$ in the NOx catalyst 7 is equal to or larger than its threshold value. These conditions may also be made the same as the conditions in which the supply of the reducing agent is prohibited, as described in the second embodiment. Then, in cases where an affirmative determination is made in step S602, the routine advances to step S607.

In step S607, the amount of NOx flowing into the NOx catalyst 7 is integrated. Then, after the step S607 is carried out, the routine returns to step S602. That is, the amount of NOx flowing into the NOx catalyst 7 is integrated until a negative determination is made in step S602.

On the other hand, in cases where a negative determination is made in step S602, the routine advances to step S603. In step S603, the amount of supply of the reducing agent is calculated. The amount of the supply of the reducing agent is calculated based on a value which is obtained by adding the integrated value of the amount of NOx calculated in step S606 and the integrated value of the amount of NOx calculated in step S607 to each other. The relation between the integrated value of the amount of NOx and the amount of the supply of the reducing agent has been beforehand obtained through experiments, etc., and stored in the ECU 10.

In step S604, the supply flag is set to on. Then, in step S605, the reducing agent is supplied according to the amount of the supply of the reducing agent calculated in step S603.

Here, note that in this embodiment, the ECU 10, which carries out the flow or routine as shown in FIG. 17, corresponds to a postponement part in the present invention.

In this manner, when there is a fear that the reducing agent may arrive at the PM sensor 17, by prohibiting the supply of the reducing agent, it is possible to suppress the detected value of the PM sensor 17 from being changed due to the influence of the reducing agent. As a result of this, it is possible to suppress the reduction in the accuracy of the failure determination of the filter 5. In addition, when the reducing agent is supplied after the prohibition of the supply of the reducing agent, the amount of the reducing agent having adsorbed to the NOx catalyst 7 can be recovered in a quick manner by increasing the amount of the supply of the reducing agent. As a result of this, it is possible to suppress the reduction in the removal rate of NOx.

EXPLANATION OF REFERENCE NUMERALS AND CHARACTERS 1 internal combustion engine
2 intake passage
3 exhaust passage
4 oxidation catalyst
5 filter
6 injection valve
7 NOx selective reduction catalyst
10 ECU
11 air flow meter
12 first exhaust gas temperature sensor
13 second exhaust gas temperature sensor
14 third exhaust gas temperature sensor
15 first NOx sensor
16 second NOx sensor
17 PM sensor
18 accelerator opening sensor
19 crank position sensor

The invention claimed is:

1. An exhaust gas purification apparatus for an internal combustion engine comprising:
   a filter that is arranged in an exhaust passage of the internal combustion engine for trapping particulate matter contained in an exhaust gas;
   an NOx selective reduction catalyst that is arranged at the downstream side of said filter and reduces NOx by means of a reducing agent which is supplied thereto;
   a supply device that supplies the reducing agent to said NOx selective reduction catalyst from the upstream side of said NOx selective reduction catalyst;
   a particulate matter (PM) sensor that detects an amount of the particulate matter in the exhaust gas at the downstream side of said NOx selective reduction catalyst, wherein the reducing agent and the particulate matter influence changes in the detected amount of the PM sensor; and
   a controller having control logic which, makes an amount of supply of the reducing agent smaller in cases where at least one of the following conditions is satisfied than in cases where any of the conditions is not satisfied to suppress a reduction in accuracy of the PM sensor during a period when the particulate matter is trapped by the PM sensor, wherein the conditions include: a condition in which the temperature of said NOx selective reduction catalyst is equal to or less than a threshold value; and a condition in which the temperature of the exhaust gas is equal to or less than a threshold value; and a condition in which the flow rate of the exhaust gas is equal to or larger than a threshold value.

2. The exhaust gas purification apparatus for an internal combustion engine as set forth in claim 1, wherein
said controller having control logic which, calculates an amount of the reducing agent passing through said NOx selective reduction catalyst based on at least one of the temperature of said NOx selective reduction catalyst or the temperature of the exhaust gas, the flow rate of said exhaust gas, and the amount of adsorption of the reducing agent in said NOx selective reduction catalyst, in such a manner that the amount of the reducing agent passing through said NOx selective reduction catalyst becomes larger in accordance with the decreasing temperature of said NOx selective reduction catalyst or the decreasing temperature of the exhaust gas, or the increasing flow rate of the exhaust gas, or the increasing amount of adsorption of the reducing agent in said NOx selective reduction catalyst, and said controller decides the amount of the supply of the reducing agent in such a manner that the amount of the reducing agent passing through said NOx selective reduction catalyst becomes less than a threshold value.

3. The exhaust gas purification apparatus for an internal combustion engine as set forth in claim 1, wherein
said controller having control logic which, calculates an amount of the reducing agent passing through said NOx selective reduction catalyst based on at least one of the temperature of said NOx selective reduction catalyst or the temperature of the exhaust gas, the flow rate of said exhaust gas, and the amount of adsorption of the reducing agent in said NOx selective reduction catalyst, in such a manner that the amount of the reducing agent passing through said NOx selective reduction catalyst becomes larger in accordance with the decreasing temperature of said NOx selective reduction catalyst or the decreasing temperature of the exhaust gas, or the increasing flow rate of the exhaust gas, or the increasing amount of adsorption of the reducing agent in said NOx selective reduction catalyst, and said controller prohibits the supply of the reducing agent in cases where the amount of the reducing agent passing through said NOx selective reduction catalyst is equal to or larger than a threshold value.

4. The exhaust gas purification apparatus for an internal combustion engine as set forth in claim 1, further comprising:
a supply increase part that supplies an amount of reducing agent in advance when it is in a state where the reducing agent does not pass through said NOx selective reduction catalyst, said amount of reducing agent thus supplied serving to reduce NOx when it becomes a state where the reducing agent passes through said NOx selective reduction catalyst so that the amount of the supply of the reducing agent is made small by said controller.

5. The exhaust gas purification apparatus for an internal combustion engine as set forth in claim 4, wherein
said supply increase part decides the amount of the reducing agent to be supplied, based on a difference between a temperature of the NOx selective reduction catalyst at which the reducing agent does not pass through said NOx selective reduction catalyst and a temperature of said NOx selective reduction catalyst at the present point in time.

6. The exhaust gas purification apparatus for an internal combustion engine as set forth in claim 1, further comprising:
a postponement part that postpones the supply of the reducing agent until it becomes a state where the reducing agent does not pass through said NOx selective reduction catalyst, in case when the time comes to supply the reducing agent during a period of time from a point in time at which it has become a state where the reducing agent passes through said NOx selective reduction catalyst, to a point in time at which it becomes a state where the reducing agent does not pass through said NOx selective reduction catalyst, said postponement part deciding an amount of reducing agent to be supplied after it has become a state where the reducing agent does not pass through said NOx selective reduction catalyst, based on an integrated value of an amount of NOx which has flowed into said NOx selective reduction catalyst from the last supply of the reducing agent.

* * * * *